United States Patent
Matsumoto et al.

[19]

[11] Patent Number: 6,128,254

[45] Date of Patent: *Oct. 3, 2000

[54] MAGNETO-OPTICAL RECORDING MEDIUM AND REPRODUCING METHOD FOR INFORMATION RECORDED ON THE MEDIUM

[75] Inventors: Koji Matsumoto; Keiji Shono, both of Kawasaki, Japan

[73] Assignee: Fujitsu Limited, Kawasaki, Japan

[ * ] Notice: This patent is subject to a terminal disclaimer.

[21] Appl. No.: 09/294,602

[22] Filed: Apr. 19, 1999

Related U.S. Application Data

[62] Division of application No. 09/030,466, Feb. 25, 1998, Pat. No. 6,020,079.

[30] Foreign Application Priority Data

Jan. 17, 1994 [JP] Japan .................. 6-002934
Sep. 5, 1994 [JP] Japan .................. 6-211103

[51] Int. Cl.$^7$ ............................................ G11B 11/00

[52] U.S. Cl. .................. 369/13; 428/694 MM

[58] Field of Search .................. 369/13, 14, 116, 369/110; 360/59, 114; 365/122; 428/694 ML, 694 DE, 694 RL, 694 MM, 694 EC, 694 RE

[56] References Cited

U.S. PATENT DOCUMENTS

| | | | |
|---|---|---|---|
| 4,908,809 | 3/1990 | Tadokoro et al. | 369/13 |
| 5,016,232 | 5/1991 | Tadokoro et al. | 369/13 |
| 5,142,513 | 8/1992 | Takehara et al. | 369/13 |
| 5,367,509 | 11/1994 | Fukumoto et al. . | |
| 5,481,410 | 1/1996 | Osato et al. . | |
| 5,486,395 | 1/1996 | Murakami et al. . | |
| 5,539,709 | 7/1996 | Sato et al. . | |
| 5,681,633 | 10/1997 | Onagi et al. | 369/13 |
| 5,787,056 | 7/1998 | Nakayama et al. | 369/13 |
| 5,821,004 | 10/1998 | Hino et al. . | |
| 5,889,740 | 3/1999 | Nakayama et al. | 369/13 |

FOREIGN PATENT DOCUMENTS

| | | |
|---|---|---|
| 4255941 | 9/1992 | Japan . |
| 512732 | 1/1993 | Japan . |
| 581717 | 4/1993 | Japan . |
| 5182207 | 7/1993 | Japan . |
| 5182267 | 7/1993 | Japan . |
| 5205336 | 8/1993 | Japan . |
| 6150413 | 5/1994 | Japan . |
| 6180874 | 6/1994 | Japan . |
| 6314443 | 11/1994 | Japan . |
| 714230 | 1/1995 | Japan . |

*Primary Examiner*—Tan Dinh
*Attorney, Agent, or Firm*—Greer, Burns & Crain, Ltd.

[57] ABSTRACT

A magneto-optical recording medium composed of a plurality of magnetic layers including a rare earth metal and a transition metal as main components. The magneto-optical recording medium includes a magnetic reproducing layer having an easy axis of magnetization perpendicular to a film plane, and a magnetic control layer formed over the magnetic reproducing layer and having an easy axis of magnetization in a plane at a room temperature. A magnetic moment of the rare earth metal of the magnetic control layer being predominant over a magnetic moment of the transition metal of the magnetic control layer. The magnetic control layer includes at least Gd as the rare earth metal and Fe as the transition metal. The magneto-optical recording medium further includes a magnetic recording layer formed over the magnetic control layer and having an easy axis of magnetization perpendicular to the film plane. A Curie temperature Tc1 of the magnetic reproducing layer, a Curie temperature Tc2 of the magnetic control layer, and a Curie temperature Tc3 of the magnetic recording layer are related to satisfy Tc1>Tc2 and Tc3>Tc2. A coercive force Hc1 of the magnetic reproducing layer at the room temperature and a coercive force Hc3 of the magnetic recording layer at the room temperature are related to satisfy Hc3>Hc1.

6 Claims, 15 Drawing Sheets

FIG. 12A
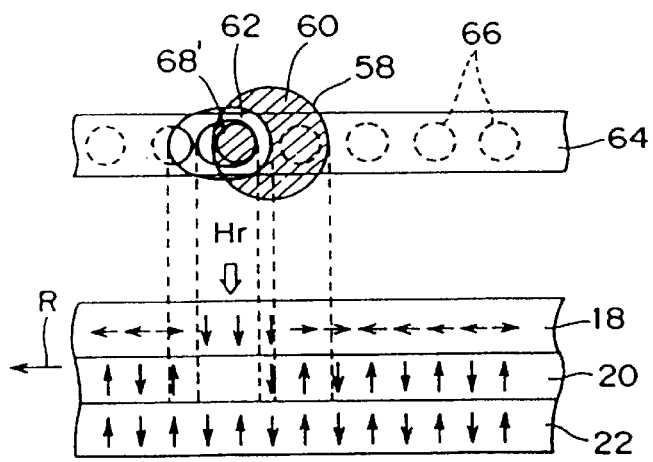
FIG. 12B
FIG. 13
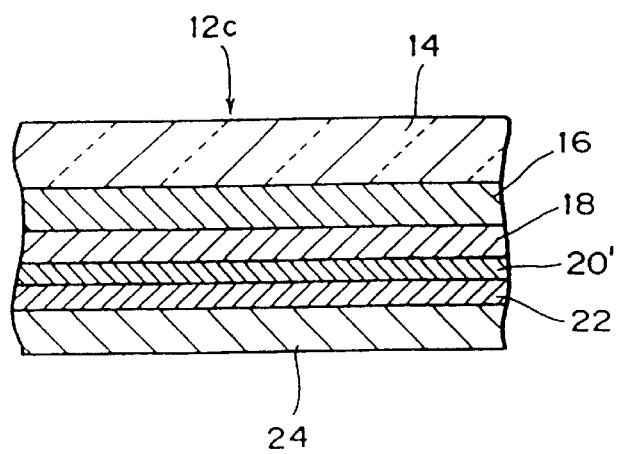

MAGNETO-OPTICAL RECORDING MEDIUM AND REPRODUCING METHOD FOR INFORMATION RECORDED ON THE MEDIUM

This is a divisional of application Ser. No. 09/030,466, filed Feb. 25, 1998 and now is U.S. Pat. No. 6,020,079.

BACKGROUND OF THE INVENTION

1. Field of the Invention

The present invention relates to a high-density magneto-optical recording medium and a reproducing method for information recorded on the medium.

2. Description of the Related Art

A magneto-optical disk is known as a high-density recording medium, and an increase in information quantity gives rise to a desire for higher densities of the medium. While the higher densities may be realized by reducing the space of recorded marks, the recording and reproducing of the marks are limited by the size of a light beam (beam spot) on the medium. When the presence of only one recorded mark in the beam spot is set, an output waveform corresponding to "1" or "0" may be observed as a reproduction signal according to whether the recorded mark is present or absent in the beam spot.

However, when the presence of plural recorded marks in the beam spot is set by reducing the space of the recorded marks, no change in reproduction output occurs regardless of movement of the beam spot on the medium. Accordingly, the output waveform becomes linear and the presence or absence of the recorded mark in the beam spot cannot be identified. To reproduce such small recorded marks having a period smaller than the size of the beam spot, it is necessary to reduce the beam spot to a small size. However, since the size of the beam spot is limited by the wavelength $\lambda$ of a light source and the numerical aperture NA of an objective lens, the beam spot cannot be sufficiently reduced to a small size.

A reproducing method has recently been proposed magnetically induced super resolution such that a recorded mark smaller in size than the beam spot can be reproduced by the use of an existing optical system. According to this method, the resolution of reproduction is improved by masking other marks during reproduction of one mark in the beam spot. Accordingly, a super resolution disk medium is required to have at least a mask layer or a reproducing layer for masking other marks so that only one mark may be reproduced during signal reproduction, in addition to a recording layer for recording marks.

A magneto-optical recording medium using a perpendicular magnetization film as the reproducing layer is proposed in Japanese Patent Laid-open No. 3-88156. In the prior art described in this publication, however, an initializing magnetic field of about several kOe is required to initialize the reproducing layer. Accordingly, a compact recording apparatus cannot be made. On the other hand, a magneto-optical recording medium using a magnetic film as the recording layer is proposed in Japanese Patent Laid-open No. 5-81717. This magnetic film has an easy axis of magnetization in a plane at room temperature and has an easy axis of magnetization perpendicular to a film surface at a given temperature or higher.

The principle of reproduction in this prior art will now be described in brief with reference to FIGS. 28A, 28B, and 28C. As shown in FIG. 28C, a magneto-optical disk 2 is formed by laminating a magnetic reproducing layer 6 and a magnetic recording layer 8 on a transparent substrate 4. The magnetic reproducing layer 6 has an easy axis of magnetization in a plane at room temperature. However, when the medium is heated to a given temperature or higher by applying a reproducing power, the easy axis of magnetization is changed to a perpendicular direction. The magnetic recording layer 8 is a perpendicular magnetization film. Reference numeral 10 denotes a light beam.

The intensity distribution of the light beam is a Gaussian distribution as shown in FIG. 28A. Accordingly, when the disk is at rest, the temperature distribution on the disk is also a similar distribution such that the central portion is higher in temperature than the peripheral portion. In actuality, however, the disk 2 is rotated in the direction of arrow R shown in FIG. 28C during reproduction. Accordingly, the temperature distribution on the disk in rotation becomes a distribution as shown in FIG. 28B so that a high-temperature area in the beam spot is shifted to the forward direction of rotation of the disk. Owing to such a temperature distribution during reproduction, the easy axis of magnetization of the magnetic reproducing layer 6 becomes an in-plane direction in a low-temperature area in the beam spot. Therefore, the Kerr rotation angle of reflected light becomes almost zero in the low-temperature area. In the high-temperature area, the easy axis of magnetization of the magnetic reproducing layer 6 is changed from an in-plane direction to an perpendicular direction.

The perpendicular magnetization of the magnetic reproducing layer 6 at this time is bonded to the magnetization of the magnetic recording layer 8 by an exchange force, and the direction of magnetization of the reproducing layer 6 is made identical with the direction of magnetization of the recording layer 8, thereby allowing the magnetization recorded in the recording layer 8 to be transferred to the reproducing layer 6. The area size of such transfer can be changed by a reproducing layer beam power or the rotation of the disk. In this manner, the size of the masking reproducing layer is controlled so is to allow the reproduction of only one recorded mark, thereby obtaining the same effect as that in the case of substantially reducing the area of the beam spot to improve the resolution and realize high-density recording and reproduction.

As mentioned above, the intensity distribution of the laser beam 10 directed onto the disk 2 is a Gaussian distribution, and the disk 2 is rotated in the direction of arrow R. As a result, a low-temperature area and a high-temperature area are formed on the reproducing layer 6. The high-temperature area is shifted to the downstream side or the trailing side of the beam spot formed on the disk. In this manner, the high-temperature area where information is reproduced is shifted to the downstream side in the beam spot, so that the intensity of the laser beam is relatively reduced. Thus, the prior art described in Japanese Patent Laid-open No. 5-81717 cannot obtain a large magneto-optical signal output. Further, as an optical mask is formed at only the upstream side in the beam spot, an opening for reproducing information cannot be reduced in size.

SUMMARY OF THE INVENTION

It is therefore an object of the present invention to provide a high-density magneto-optical recording medium which can accurately record a mark smaller than that in the prior art and can reproduce it with a greater magneto-optical signal.

It is another object of the present invention to provide an information reproducing method which can accurately reproduce information recorded with a high density on the magneto-optical recording medium.

According to a first aspect of the present invention, there is provided a magneto-optical recording medium comprising a transparent substrate; a first magnetic layer laminated on said transparent substrate and having an easy axis of magnetization in a plane at room temperature; a second magnetic layer laminated on said first magnetic layer and having an easy axis of magnetization perpendicular to said substrate; and a third magnetic layer laminated on said second magnetic layer and having an easy axis of magnetization perpendicular to said substrate; wherein a Curie temperature Tc1 of said first magnetic layer, a Curie temperature Tc2 of said second magnetic layer, and a Curie temperature Tc3 of said third magnetic layer are related to satisfy Tc1>Tc2 and Tc3>Tc2.

The second magnetic layer having the easy axis of magnetization perpendicular to the substrate may be replaced by a second magnetic layer having an easy axis of magnetization in a plane at room temperature. As a modification of the first aspect, a nonmagnetic intermediate layer may be interposed between the first magnetic layer and the second magnetic layer or between the second magnetic layer and the third magnetic layer. Preferably, each magnetic layer is formed from a rare earth-transition metal amorphous alloy film. Other alloy films and magnetic oxide films may be adopted as each magnetic layer.

According to a second aspect of the present invention, there is provided a magneto-optical recording medium comprising a transparent substrate; a first magnetic layer laminated on said transparent substrate and having an easy axis of magnetization perpendicular to said substrate; a second magnetic layer laminated on said first magnetic layer and having an easy axis of magnetization in a plane at room temperature; a third magnetic layer laminated on said second magnetic layer and having an easy axis of magnetization perpendicular to said substrate; and a fourth magnetic layer laminated on said third magnetic layer and having an easy axis of magnetization perpendicular to said substrate; wherein a Curie temperature Tc1 of said first magnetic layer, a Curie temperature Tc2 of said second magnetic layer, a Curie temperature Tc3 of said third magnetic layer, and a Curie temperature Tc4 of said fourth magnetic layer are related to satisfy Tc1>Tc3, Tc2>Tc3, and Tc4>Tc3; and a coercive force Hc1 of said first magnetic layer at room temperature, a coercive force Hc2 of said second magnetic layer at room temperature, a coercive force Hc3 of said third magnetic layer at room temperature, and a coercive force Hc4 of said fourth magnetic layer at room temperature are related to satisfy Hc4>Hc3 and Hc4>Hc1.

According to a third aspect of the present invention, there is provided a magneto-optical recording medium comprising a transparent substrate; a first magnetic layer laminated on said transparent substrate and having an easy axis of magnetization perpendicular to said substrate; a second magnetic layer laminated on said first magnetic layer and having an easy axis of magnetization in a plane at room temperature: and a third magnetic layer laminated on said second magnetic layer and having an easy axis of magnetization perpendicular to said substrate; wherein a Curie temperature Tc1 of said first magnetic layer, a Curie temperature Tc2 of said second magnetic layer, and a Curie temperature Tc3 of said third magnetic layer are related to satisfy Tc1>Tc2 and Tc3>Tc2; and a coercive force Hc1 of said first magnetic layer at room temperature and a coercive force Hc3 of said third magnetic layer at room temperature are related to satisfy Hc3>Hc1.

According to another aspect of the present invention, there is provided a reproducing method for information recorded on a magneto-optical recording medium comprising a transparent substrate; a first magnetic layer laminated on said transparent substrate and having an easy axis of magnetization in a plane at room temperature; a second magnetic layer laminated on said first magnetic layer and having an easy axis of magnetization perpendicular to said substrate; and a third magnetic layer laminated on said second magnetic layer and having an easy axis of magnetization perpendicular to said substrate; wherein a Curie temperature Tc1 of said first magnetic layer, a Curie temperature Tc2 of said second magnetic layer, and a Curie temperature Tc3 of said third magnetic layer are related to satisfy Tc1>Tc2 and Tc3>Tc2; said reproducing method comprising the steps of directing a laser beam onto said recording medium as applying a bias magnetic field to heat said recording medium to temperatures lower than the Curie temperature of said third magnetic layer; and forming a temperature distribution in a beam spot, said temperature distribution comprising a first area where the direction of magnetization of said first magnetic layer is an in-plane direction, a second area where magnetization of said third magnetic layer is transferred to said second magnetic layer and said first magnetic layer by exchange bond, and a third area where the temperature of said second magnetic layer becomes higher than its Curie temperature.

According to still another aspect of the present invention, there is provided a reproducing method for information recorded on a magneto-optical recording medium comprising a transparent substrate; a first magnetic layer laminated on said transparent substrate and having an easy axis of magnetization perpendicular to said substrate; a second magnetic layer laminated on said first magnetic layer and having an easy axis of magnetization in a plane at room temperature; a third magnetic layer laminated on said second magnetic layer and having an easy axis of magnetization perpendicular to said substrate; and a fourth magnetic layer laminated on said third magnetic layer and having an easy axis of magnetization perpendicular to said substrate; wherein a Curie temperature Tc1 of said first magnetic layer, a Curie temperature Tc2 of said second magnetic layer, a Curie temperature Tc3 of said third magnetic layer, and a Curie temperature Tc4 of said fourth magnetic layer are related to satisfy Tc1>Tc3, Tc2>Tc3, and Tc4>Tc3; and a coercive force Hc1 of said first magnetic layer at room temperature, a coercive force Hc2 of said second magnetic layer at room temperature, a coercive force Hc3 of said third magnetic layer at room temperature, and a coercive force Hc4 of said fourth magnetic layer at room temperature are related to satisfy Hc4>Hc3 and Hc4>Hc1; said reproducing method comprising the steps of directing a laser beam onto said recording medium as applying a bias magnetic field to heat said recording medium to temperatures lower than the Curie temperature of said fourth magnetic layer; and forming a temperature distribution in a beam spot, said temperature distribution comprising a first area where the direction of magnetization of said second magnetic layer is an in-plane direction, a second area where magnetization of said fourth magnetic layer is transferred to said third magnetic layer, said second magnetic layer, and said first magnetic layer by exchange bond, and a third area where the temperature of said third magnetic layer becomes higher than its Curie temperature.

According to a further aspect of the present invention, there is provided a reproducing method for information recorded on a magneto-optical recording medium comprising a transparent substrate; a first magnetic layer laminated on said transparent substrate and having an easy axis of magnetization perpendicular to said substrate; a second magnetic layer laminated on said first magnetic layer and having an easy axis of magnetization in a plane at room temperature; and a third magnetic layer laminated on said second magnetic layer and having an easy axis of magnetization perpendicular to said substrate; wherein a Curie temperature Tc1 of said first magnetic layer, a Curie temperature Tc2 of said second magnetic layer, and a Curie temperature Tc3 of said third magnetic layer are related to satisfy Tc1>Tc2 and Tc3>Tc2; and a coercive force Hc1 of said first magnetic layer at room temperature and a coercive force Hc3 of said third magnetic layer at room temperature are related to satisfy Hc3>Hc1; said reproducing method comprising the steps of directing a laser beam onto said recording medium as applying a bias magnetic field to heat said recording medium to temperatures lower than the Curie temperature of said third magnetic layer; and forming a temperature distribution in a beam spot, said temperature distribution comprising a first area where the direction of magnetization of said first magnetic layer is identical with the direction of said bias magnetic field, a second area where magnetization of said third magnetic layer is transferred to said second magnetic layer and said first magnetic layer by exchange bond, and a third area where the temperature of said second magnetic layer becomes higher than its Curie temperature and the direction of said first magnetic layer is identical with the direction of said bias magnetic field.

The information reproducing method of the present invention is characterized in that in reproducing information recorded on the magneto-optical recording medium having the first, second, and third magnetic layers, a mark smaller than that in the prior art is reproduced accurately by utilizing a temperature gradient generated in the beam spot formed on the recording medium. In a low-temperature area in the beam spot, the direction of magnetization of the first magnetic layer is made identical with the in-plane direction to form an in-plane mask. In a high-temperature area in the beam spot whose temperature is higher than the Curie temperature of the second magnetic layer, the magnetization of the second magnetic layer disappears and the direction of magnetization of the first magnetic layer is made identical with the direction of the bias magnetic field to form an up spin mask or a down spin mask.

In an intermediate-temperature area (opening) in the beam spot, the magnetization of the third magnetic layer is transferred through the second magnetic layer to the first magnetic layer, thereby allowing the information recorded in the third magnetic layer to be reproduced. That is, in differentially detecting a magneto-optical output, the low-temperature area and the high-temperature area in the beam spot function as masks to inhibit reading of a magneto-optical signal in these areas, while a magneto-optical signal in only the intermediate-temperature area is allowed to be read. Accordingly, a mark having a size less than the diffraction limit of a laser wavelength can be read accurately.

Also in reproducing information recorded on the magneto-optical recording medium having the four magnetic layers, the principle of reproduction is similar to that in the case of reproducing information recorded on the magneto-optical recording medium having the three magnetic layers mentioned above. In this case, the first magnetic layer laminated on the transparent substrate is a perpendicular magnetization film, and the second magnetic layer for reading a signal has a relatively wide temperature area where in-plane magnetization is changed to perpendicular magnetization, resulting in reduction in C/N of a reproduction output. However, the provision of the first magnetic layer that is a perpendicular magnetization film can improve the C/N of a reproduction output.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 12A is a plan view illustrating a data reproducing method when a bias magnetic field is applied downward;

FIG. 12B is a vertical sectional view of the recording medium in the condition of FIG. 12A;

FIG. 13 is a vertical sectional view of a magneto-optical recording medium according to a fourth preferred embodiment of the present invention;

DETAILED DESCRIPTION OF THE PREFERRED EMBODIMENTS

Figure 1:
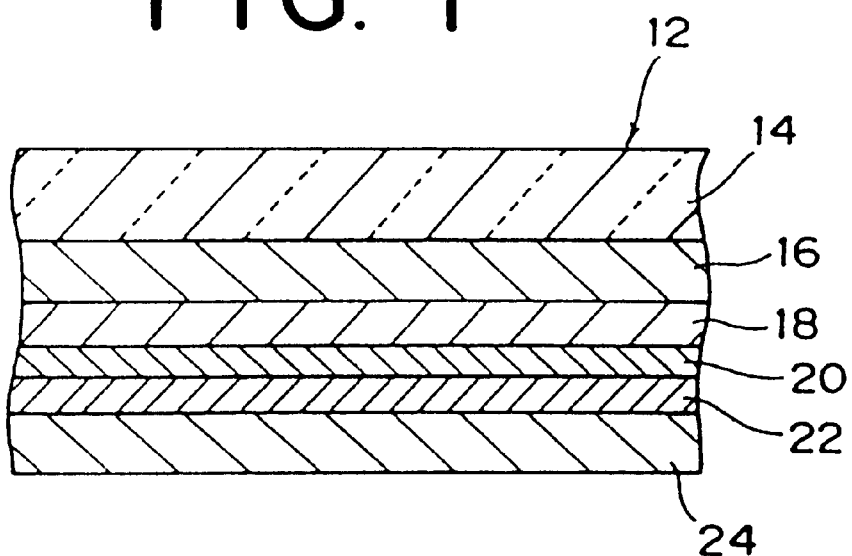
FIG. 1 is a vertical sectional view of a magneto-optical recording medium according to a first preferred embodiment of the present invention.

The structure of a magneto-optical recording medium 12 according to a first preferred embodiment of the present invention will be described with reference to FIG. 1. The magneto-optical recording medium 12 is usually in the form of disk. A dielectric layer 16 formed of SiN or the like by sputtering, for example, is laminated on a transparent substrate 14 formed of glass or the like. The dielectric layer 16 prevents oxidation and corrosion of a magnetic layer laminated thereon. Resins such as polycarbonate, polymethyl methacrylate, and amorphous olefin may be adopted as the transparent substrate 14. Metal nitrides such as AlN, metal oxides such as $SiO_2$ and $Al_2O_3$, and metal sulfides such as ZnS may be adopted as the dielectric layer 16.

A magnetic reproducing layer 18 formed from a rare earth-transition metal amorphous alloy film such as GdFeCo is laminated on the dielectric layer 16. The magnetic reproducing layer 18 has an easy axis of magnetization in a plane at room temperature. Preferably, the easy axis of magnetization of the reproducing layer 18 is changed from the in-plane direction to the perpendicular direction at temperatures higher than a given temperature to which the layer 18 is heated by a reproducing beam power. A magnetic control layer 20 formed from a rare earth-transition metal amorphous alloy film such as TbFe is laminated on the magnetic reproducing layer 18. The magnetic control layer 20 has an easy axis of magnetization perpendicular to the substrate 14.

A magnetic recording layer 22 formed from a rare earth-transition metal amorphous alloy film such as TbFeCo is laminated on the magnetic control layer 20. The magnetic recording layer 22 has an easy axis of magnetization perpendicular to the substrate 14. A Curie temperature Tc1 of the reproducing layer 18, a Curie temperature Tc2 of the control layer 20, and a Curie temperature Tc3 of the recording layer 22 are related to satisfy Tc1>Tc2 and Tc3>Tc2.

A protective film 24 is laminated on the magnetic recording layer 22 to complete the magneto-optical recording medium 12. The protective film 24 prevents entry of water, oxygen, or other substances such as halogen from the air to protect the magnetic recording layer 22. Metal nitrides such as SiN and AlN, metal oxides such as $SiO_2$ and $Al_2O_3$, and metal sulfides such as ZnS may be adopted as the protective film 24.

Figure 2:
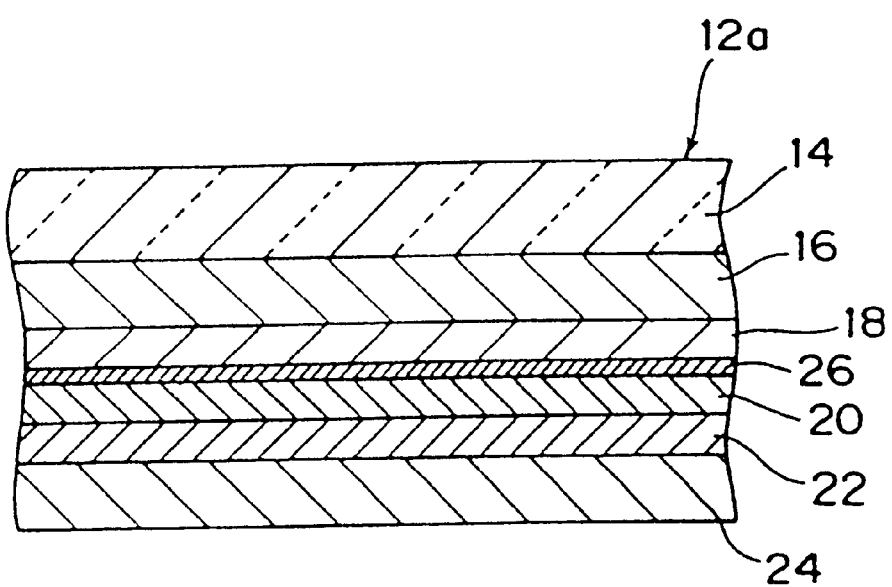
FIG. 2 is a vertical sectional view of a magneto-optical recording medium according to a second preferred embodiment of the present invention.

Referring to FIG. 2, there is shown the structure of a magneto-optical recording medium 12a according to a second preferred embodiment of the present invention, which is a modification of the first preferred embodiment shown in FIG. 1. The recording medium 12a according to the second preferred embodiment differs from the recording medium 12 shown in FIG. 1 in the point that a nonmagnetic intermediate layer 26 is interposed between the magnetic reproducing layer 18 and the magnetic control layer 20. The nonmagnetic intermediate layer 26 is formed from metal nitrides such as SiN and AlN, metal oxides such as $SiO_2$ and $Al_2O_3$, or metal sulfides such as ZnS.

As the nonmagnetic intermediate layer 26 is interposed between the magnetic reproducing layer 18 and the magnetic control layer 20, the exchange bond between the magnetic reproducing layer 18 and the magnetic control layer 20 is perfectly cut off. The nonmagnetic intermediate layer 26 must be thin enough to permit the magnetostatic bond between the magnetic control layer 20 and the magnetic reproducing layer 18 when the magnetic reproducing layer 18 is heated to temperatures higher than the given temperature. Specifically, the thickness of the nonmagnetic intermediate layer 26 is preferably in the range of 1 nm to 10 nm.

Figure 3:
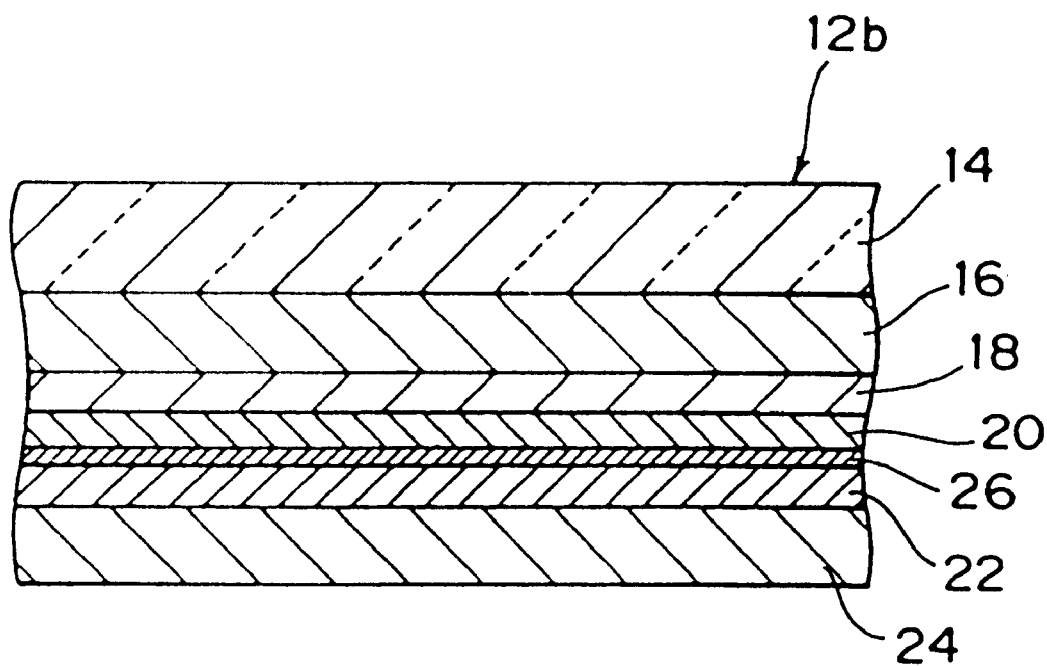
FIG. 3 is a vertical sectional view of a magneto-optical recording medium according to a third preferred embodiment of the present invention.

FIG. 3 shows the structure of a magneto-optical recording medium 12b according to a third preferred embodiment of the present invention, which is a modification of the second preferred embodiment shown in FIG. 2. In the third preferred embodiment, the nonmagnetic intermediate layer 26 is interposed between the magnetic control layer 20 and the magnetic recording layer 22.

Figure 4:
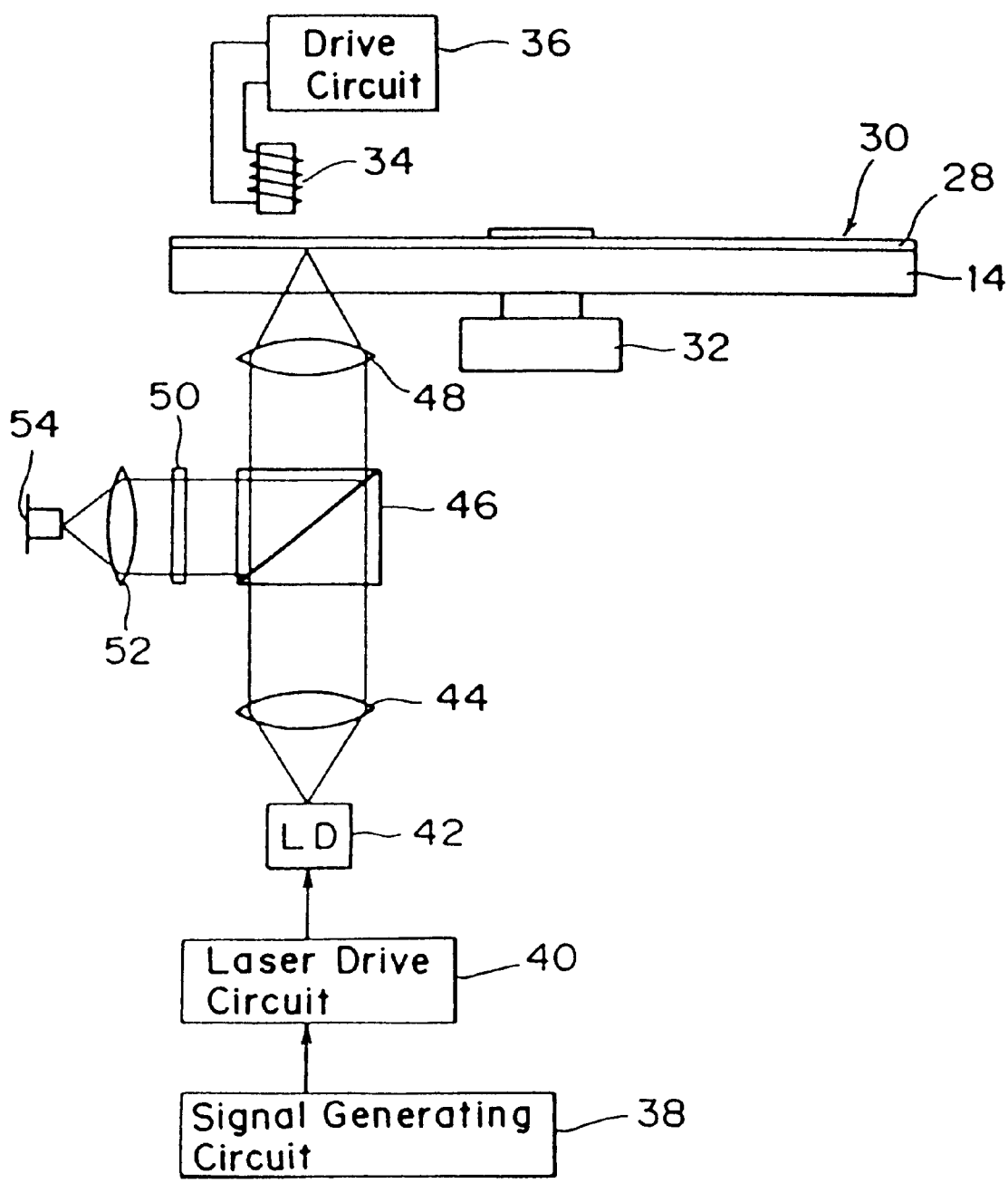
FIG. 4 is a schematic illustration of a magneto-optical disk drive unit.

Referring to FIG. 4, there is schematically shown the structure of a magneto-optical disk drive unit employable for the reproducing method for information according to the present invention. A magneto-optical disk 30 is formed by laminating a magnetic film 28 consisting of three layers on the transparent substrate 14. The magneto-optical disk 30 is rotated by a spindle motor 32. Reference numeral 34 denotes an electromagnet to be driven by an electromagnet drive circuit 36. The electromagnet 34 applies a bias magnetic field having a given direction to the magneto-optical disk 30. The direction of the bias magnetic field is changed from an upward direction to a downward direction and vice versa according to the direction of a current flowing in the electromagnet 34.

Alternatively, the electromagnet 34 may be replaced by a compact permanent magnet generating a magnetic field of hundreds of Oe. In this case, the direction of the bias magnetic field is changed by rotating S and N poles of the magnet by 180°. A data signal to be written is generated from a signal generating circuit 38, and is input into a laser drive circuit 40. The laser drive circuit 40 drives a laser diode 42 with modulation according to the data signal.

A laser beam generated from the laser diode 42 is collimated by a collimator lens 44 to pass through a beam splitter 46, then being focused on the magnetic film 28 of the magneto-optical disk 30 by an objective lens 48. While the bias magnetic field is being applied in a given direction by the electromagnet 34, the laser diode 42 is driven to direct the laser beam onto the magnetic film 28 of the magneto-optical disk 30, thereby writing the data signal to the disk 30.

On the other hand, in reproducing information (data signal) recorded on the magneto-optical disk 30, the laser diode 42 is driven to apply a reproducing beam power to the magneto-optical disk 30 while the bias magnetic field is being applied in a given direction by the electromagnet 34. Reflected light from the magneto-optical disk 30 is collimated by the objective lens 48 and is then reflected by the beam splitter 46. The reflected light from the beam splitter 46 is allowed to pass through an analyzer 50 and is then condensed by a lens 52 to reach a photodetector 54, in which the information recorded on the magneto-optical disk 30 is reproduced as an electrical signal.

Figure 5:
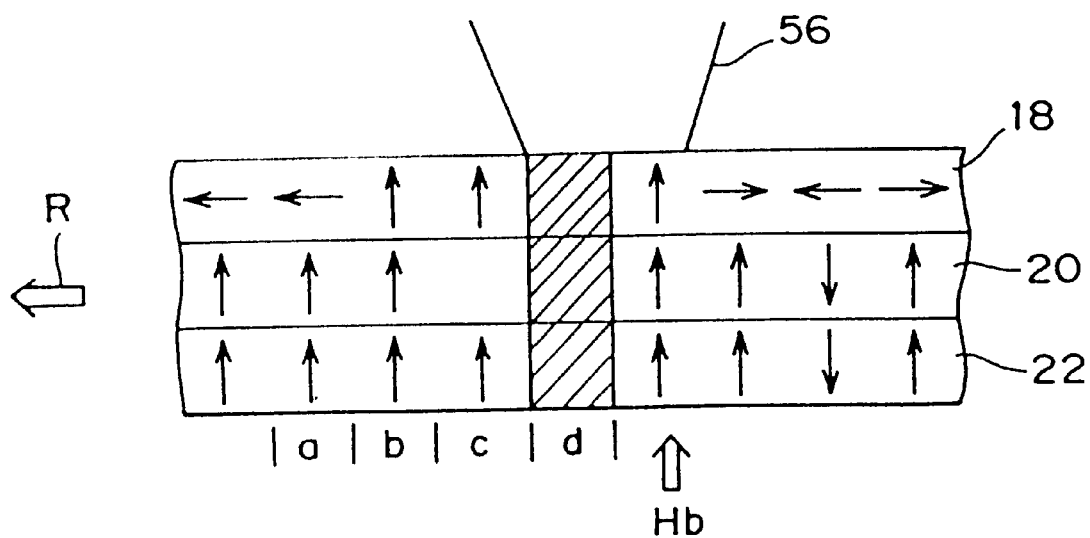
FIG. 5 is a vertical sectional view illustrating data erasing.

An erasing method for data recorded on the magneto-optical recording medium according to the first preferred embodiment shown in FIG. 1 will now be described with reference to FIG. 5. The magneto-optical recording medium is rotated in the direction of arrow R. In an area d of the magneto-optical recording medium, a bias magnetic field Hb is applied in an erasing direction and a laser beam 56 is directed onto the medium to heat the recording layer 22 to temperatures higher than its Curie temperature, thereby erasing the data.

In an area c being cooled, the temperature is higher than the Curie temperature of the control layer 20, and therefore no magnetization appears in the control layer 20. In an area b, however, the temperature is lower than the Curie temperature of the control layer 20, and therefore the magnetization of the recording layer 22 is transferred to the control layer 20. Further, the magnetization of the control layer 20 is transferred to the reproducing layer 18. However, in an area a further lowered in temperature, the easy direction of magnetization of the reproducing layer 18 is changed to an in-plane direction. Thus, a data erased condition is obtained.

Figure 6:
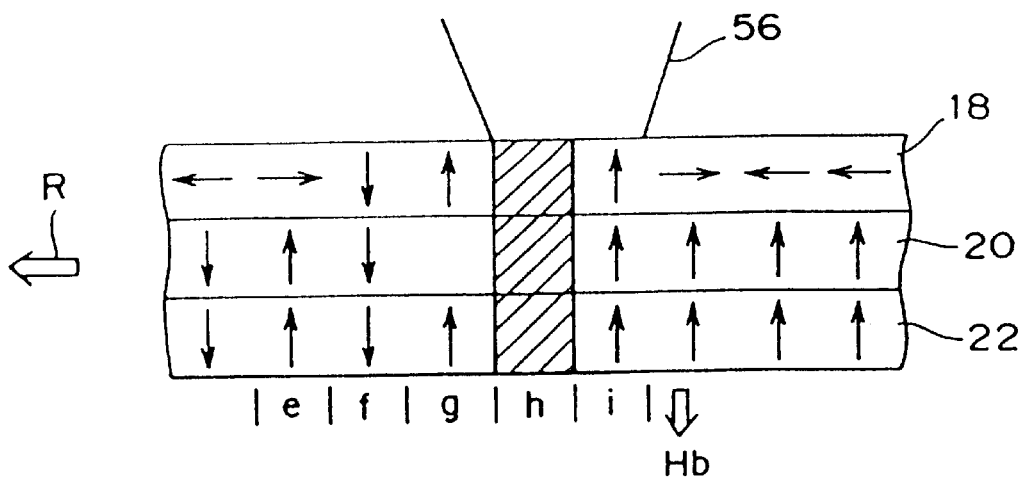
FIG. 6 is a vertical sectional view illustrating data writing.

A writing method for data will now be described with reference to FIG. 6. In writing data to the magneto-optical recording medium, the bias magnetic field Hb is applied in the direction opposite to that in the case of erasing shown in FIG. 5. In an area i as a part of a laser beam irradiation area, magnetization information of the recording layer 22 has already been transferred to the reproducing layer 18. An area h is a high-temperature area in a beam spot. In this area h, the reproducing layer 18, the control layer 20, and the recording layer 22 are heated to temperatures higher than their Curie temperatures, thereby writing data to the recording layer 22 as downward applying the bias magnetic field Hb.

In an area g being cooled after the writing of the data, both the reproducing layer 18 and the recording layer 22 are magnetized in the direction of the bias magnetic field Hb. In this area g, the temperature is higher than the Curie temperature of the control layer 20, and therefore no magnetization appears in the control layer 20. In an area f further cooled, magnetization appears in the control layer 20, and the direction of magnetization of the control layer 20 becomes identical with the directions of magnetization of the reproducing layer 18 and the recording layer 22. In an area e further cooled near room temperature, the magnetization condition of the recording layer 22 is unchanged, but the direction of magnetization of the reproducing layer 18 is changed from the perpendicular direction to the in-plane direction. The size of a mark to be recorded is controlled by adjusting the laser power.

Figure 28A:
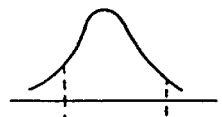
FIGS. 28A, 28B, and 28C are views illustrating the principle of reproduction in the prior art.
Figure 28B:
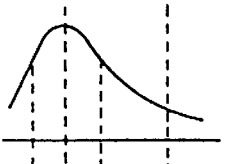
Figure 28C:
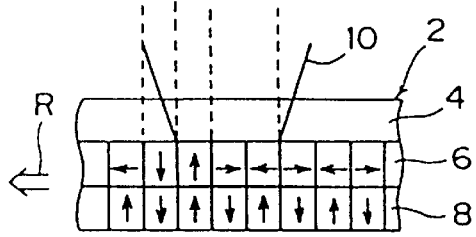

A reproducing method for data recorded on the magneto-optical recording medium will now be described with reference to FIGS. 7A to 9B. As previously described with reference to FIG. 28B, a temperature gradient is formed in the beam spot formed on the recording medium. Generally, this is due to the fact that (a) a temperature distribution similar to a Gaussian distribution is formed in the focused beam spot, and (b) when the recording medium is moved (i.e., the beam spot is relatively moved), heat is accumulated at a trailing portion of the beam spot. An actual temperature distribution is decided according to the reproducing laser power, the rotating speed of the recording medium, the thickness of the magnetic film, etc.

Figure 7A:
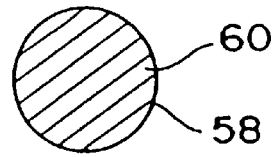
FIG. 7A is a plan view illustrating a reproducing condition when the temperature in a beam spot is lower than Tcopy.
Figure 7B:
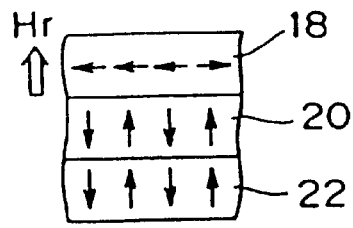
FIG. 7B is a vertical sectional view of the recording medium in the condition of FIG. 7A.

In FIGS. 7A to 9B, Hr denotes a bias magnetic field for reproduction, and it is applied in the direction opposite to the direction of the bias magnetic field Hb for data writing. However, as will be described later, the direction of the bias magnetic field Hr for data reproduction may be the same as the direction of the bias magnetic field Hb for data writing. FIGS. 7A and 7B show the condition where the temperature inside the beam spot 58 is lower than a temperature Tcopy at which the magnetization of the recording layer 22 is transferred to the reproducing layer 18. In this condition, the direction of magnetization of the reproducing layer 18 is an in-plane direction to form an in-plane mask 60 in the reproducing layer 18, so that no magneto-optical signal is output.

Figure 8A:
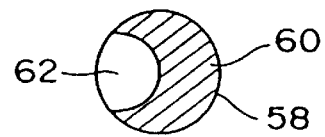
FIG. 8A is a plan view illustrating a reproducing condition when the temperature in the beam spot is higher than Tcopy and lower than Tc2.
Figure 8B:
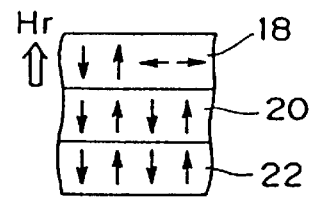
FIG. 8B is a vertical sectional view of the recording medium in the condition of FIG. 8A.
Figure 9A:
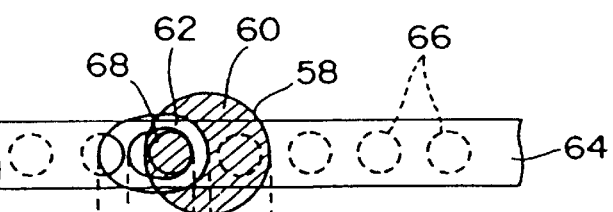
FIG. 9A is a plan view illustrating a data reproducing method according to the first preferred embodiment.
Figure 9B:
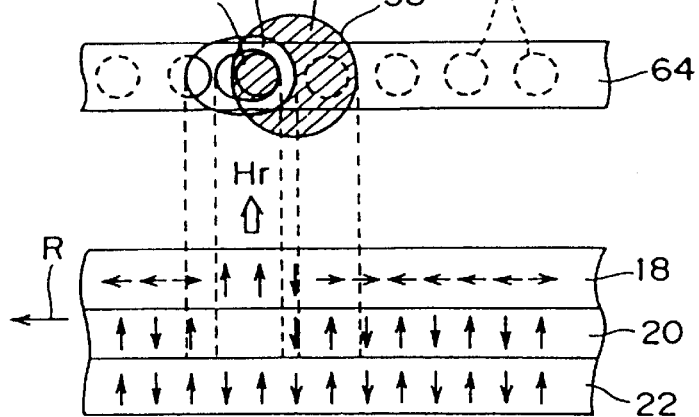
FIG. 9B is a vertical sectional view of the recording medium in the condition of FIG. 9A.

FIGS. 8A and 8B show the condition where the temperature inside the beam spot 58 is higher than the temperature Tcopy and lower than the Curie temperature Tc2 of the control layer 20. In this condition, an in-plane mask 60 and an opening 62 are formed in the beam spot 58. This condition is similar to the data reproducing condition in Japanese Patent Laid-open No. 5-81717 mentioned above, and a magneto-optical signal can be read through the opening 62. When the reproducing laser power is further increased, the condition shown in FIGS. 9A and 9B is obtained. That is, there are formed in the beam spot 58 a low-temperature area where the direction of magnetization of the reproducing layer 18 is an in-plane direction, an intermediate-temperature area where the magnetization of the recording layer 22 is transferred to the control layer 20 and the reproducing layer 18 by exchange bond, and a high-temperature area where the temperature of the control layer 20 becomes higher than its Curie temperature. As shown in FIG. 9A, a plurality of marks 66 shown by broken lines are formed in a track 64.

In the low-temperature area, the in-plane mask 60 is formed, while in the high-temperature area, an up spin mask 68 is formed to upward direct the magnetization of the reproducing layer 18. The opening 62 is formed in the intermediate-temperature area between the in-plane mask 60 and the up spin mask 68. The condition in the up spin mask 68 is that the recording medium is heated to temperatures higher than the Curie temperature Tc2 of the control layer 20 to result in the absence of magnetization of the control layer 20, causing no magnetic bond between the reproducing layer 18 and the recording layer 22.

Accordingly, the reproducing layer 18 has almost no coercive force, and therefore the direction of magnetization of the reproducing layer 18 becomes identical with the direction of the bias magnetic field Hr for reproduction. That is, in the high-temperature area whose temperature is higher than the Curie temperature of the control layer 20, the magnetization of the reproducing layer 18 is always upward directed, so that the reproducing layer 18 functions as a kind of mask to hinder outputting of a magneto-optical signal. Accordingly, the very small opening 62 can be formed as compared with the conventional method described in Japanese Patent Laid-open No. 5-81717. Furthermore, the opening 62 is formed at the central portion of the beam spot at which the laser intensity is larger than that at the peripheral portion of the beam spot, thereby obtaining a large magneto-optical signal output.

Examination on the degree of improvement in resolution was made in reproducing information recorded on the magneto-optical recording medium according to the first preferred embodiment by using the reproducing method of the present invention. When the wavelength of the laser used for reproduction is set to 780 nm, the resolution (which means a mark length to be accurately reproducible) is about 0.8 μm from the diffraction limit theory. In the prior art described in Japanese Patent Laid-open No. 5-81717 wherein a reproducing layer is provided on a recording layer, the resolution is about 0.5 μm even with an optimized reproducing power. In addition, since the opening is formed at the peripheral portion of the beam spot, the magneto-optical signal output is small and a large reproduction output cannot be obtained in the prior art.

Figure 10:
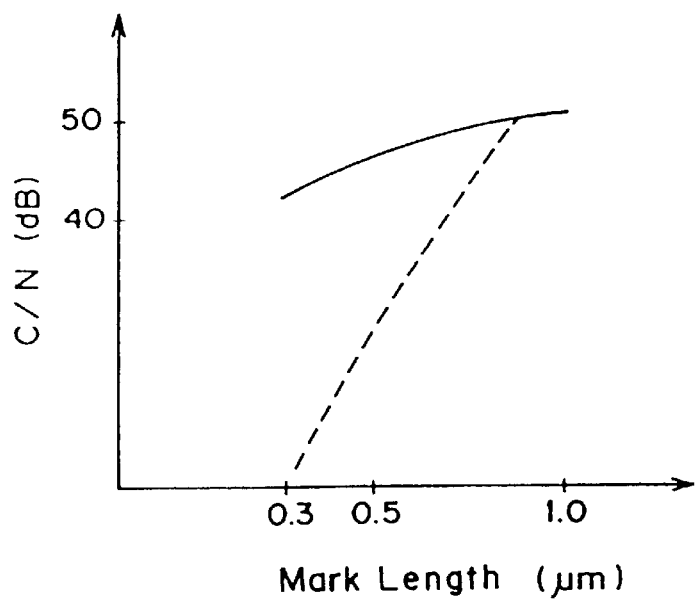
FIG. 10 is a graph showing the mark length dependency of C/N in the reproducing method according to the first preferred embodiment in comparison with the prior art.

According to the reproducing method of the present invention, since the in-plane mask 60 and the up spin mask 68 are formed in the beam spot, the resolution is improved to about 0.3 μm. Furthermore, since the opening 62 is formed near the center of the beam spot, a magneto-optical signal output larger than that obtained by the conventional reproducing method can be obtained. FIG. 10 shows the mark length dependency of C/N in the reproducing method according to the first preferred embodiment of the present invention in comparison with the conventional reproducing method. In FIG. 10, the reproducing method of the present invention is shown by a solid line, and the conventional reproducing method is shown by a broken line.

Figure 11:
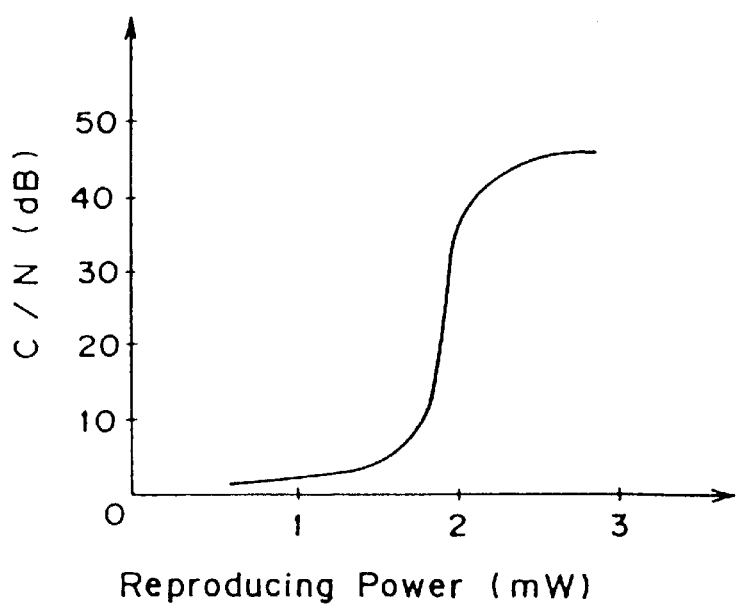
FIG. 11 is a graph showing the reproducing power dependency of C/N.

FIG. 11 shows the reproducing power dependency of C/N, in which when the reproducing power is higher than a certain value, e.g., 1.7 mW, C/N is remarkably improved. This is due to the fact that the reproducing power higher than such a certain value causes the formation of the in-plane mask and the up spin mask in the beam spot, resulting in the formation of a very small opening.

In the present invention as described above, only a signal at the opening as the intermediate-temperature area is transferred from the recording layer 22 to the reproducing layer 18, and the other area except the opening in the beam spot is magneto-optically masked by the in-plane mask 60 and the up spin mask 68, thereby allowing the reproduction of a magneto-optical signal in a very small area. Accordingly, the interference of signals between adjacent marks can be eliminated, and the pitch of marks can be more reduced. In addition, the crosstalk between adjacent tracks can also be improved.

FIGS. 12A and 12B show another reproducing method of the present invention in the case where the bias magnetic field Hr for reproduction is applied downward, that is, it is applied in the same direction as the direction of the bias magnetic field Hb for data recording. In this case, the in-plane mask 60 and a down spin mask 68' are formed in the beam spot 58, and the small opening 62 is formed between the two masks 60 and 68' in the same manner as that by the reproducing method shown in FIGS. 9A and 9B. Thus, the reproducing method of the present invention does not limit the direction of the bias magnetic field for reproduction, that is, allows both the upward direction and the downward direction.

Referring to FIG. 13, there is shown the structure of a magneto-optical recording medium 12c according to a fourth preferred embodiment of the present invention. In the following description of this preferred embodiment, the same parts as those in the first preferred embodiment shown in FIG. 1 are denoted by the same reference numerals, and the explanation thereof will be omitted to avoid repetition. In the recording medium 12c according to this preferred embodiment, each of a magnetic reproducing layer 18 and a magnetic control layer 20' has an easy axis of magnetization in a plane at room temperature. The magnetic control layer 20' is formed from a rare earth-transition metal amorphous alloy film such as GdFe. Preferably, the easy axis of magnetization of each of the reproducing layer 18 and the control layer 20' is changed from the in-plane direction to the perpendicular direction at temperatures higher than a given temperature to which the medium is heated by a reproducing beam power.

A Curie temperature Tc1 of the reproducing layer 18, a Curie temperature Tc2 of the control layer 20', and a Curie temperature Tc3 of the recording layer 22 are related to satisfy Tc1>Tc2 and Tc3>Tc2. Preferably, a magnetic moment of rare earth metal contained in the reproducing layer 18 is predominant over a magnetic moment of transition metal contained in the reproducing layer 18 at room temperature. The reproducing layer 18 contains at least Gd and Fe. The content of Gd in the reproducing layer 18 is preferably in the range of 26 at % to 35 at %.

Similarly, it is preferable that a magnetic moment of rare earth metal contained in the control layer 20' is predominant over a magnetic moment of transition metal contained in the control layer 20' at room temperature. The control layer 20' contains at least Gd and Fe, or at least Dy and Fe. The content of Gd in the control layer 20' is preferably in the range of 26 at % to 35 at %. Preferably, the control layer 20' further contains a nonmagnetic material selected from the group consisting of Si, Al, and Ti. The content of the nonmagnetic material in the control layer 20' is set to preferably 60 at % or less.

Figure 14:
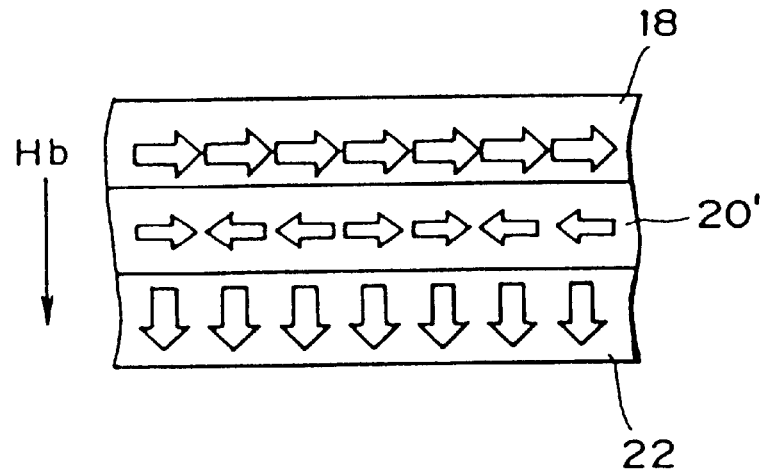
FIG. 14 is a vertical sectional view illustrating data erasing.

An erasing method for data according to this preferred embodiment will now be described with reference to FIG. 14. A bias magnetic field Hb is applied downward, and a laser beam is directed onto the recording medium to temperatures higher than a temperature at which the direction of magnetization of the recording layer 22 is inverted, thereby downward directing the magnetization of the recording layer 22. When the laser beam is removed, the temperature of the recording medium lowers to room temperature. Both the reproducing layer 18 and the control layer 20' become in-plane magnetization films at room temperature, so that the recording layer 22 is not magnetically bonded to the reproducing layer 18 and the control layer 20'.

Figure 15:
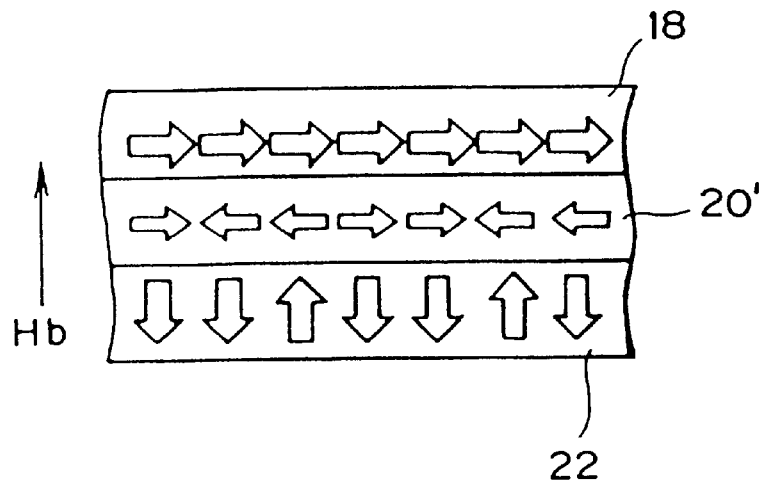
FIG. 15 is a vertical sectional view illustrating data writing.

A writing method for data according to this preferred embodiment will now be described with reference to FIG. 15. A bias magnetic field Hb is applied in the direction opposite to the erasing direction mentioned above, that is, in the upward direction, and a strong laser beam is directed onto only a data writing portion of the recording medium, thereby upward directing the magnetization of the recording layer 22 at only the data writing portion. When the laser beam is removed, the temperature of the recording medium lowers to room temperature. Both the recording layer 18 and the control layer 20' become in-plane magnetization films at room temperature, so that the recording layer 22 is not magnetically bonded to the reproducing layer 18 and the control layer 20'.

Figure 16A:
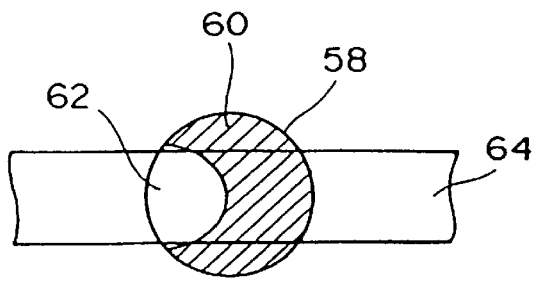
FIG. 16A is a plan view illustrating a single-masked reproducing method.
Figure 16B:
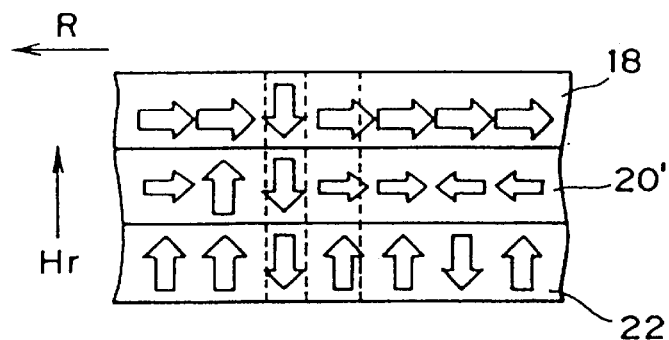
FIG. 16B is a vertical sectional view of the recording medium in the condition of FIG. 16A.

A single-masked reproducing method according to this preferred embodiment will now be described with reference to FIGS. 16A and 16B. When the laser beam is directed onto the track 64 of the recording medium, there are formed in the beam spot 58 a low-temperature area whose temperature is lower than Tcopy and a high-temperature area whose temperature is higher than Tcopy and lower than the Curie temperature Tc2 of the control layer 20'. Accordingly, there are formed in the beam spot 58 an in-plane mask 60 where the direction of magnetization of the reproducing layer 18 is an in-plane direction and an opening 62 where the magnetization of the recording layer 22 is transferred to the control layer 20' and the reproducing layer 18. This condition is similar to that of data reproduction in Japanese Patent Laid-open No. 5-81717 mentioned above. That is, a magneto-optical signal can be read through the opening 62.

Figure 17A:
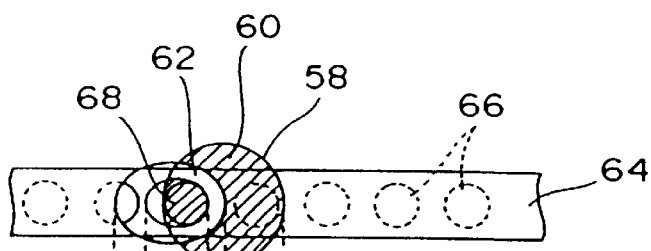
FIG. 17A is a plan view illustrating a data reproducing method according to the fourth preferred embodiment.
Figure 17B:
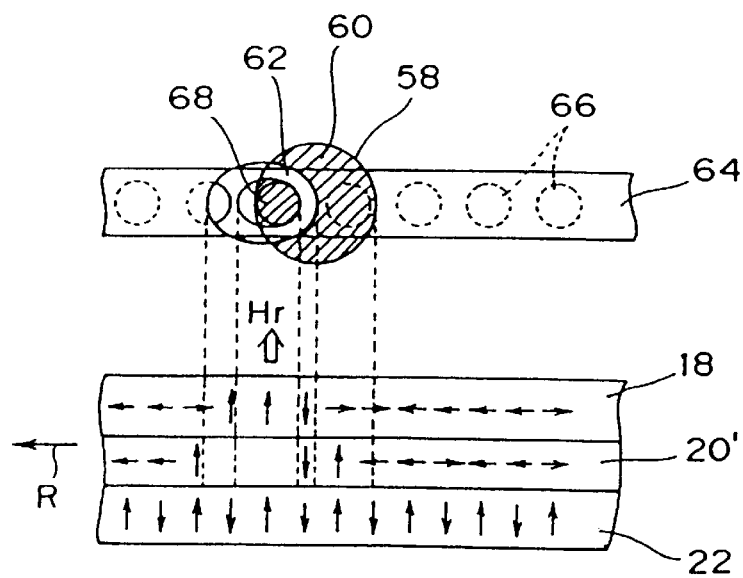
FIG. 17B is a vertical sectional view of the recording medium in the condition of FIG. 17A.

When the reproducing laser power is further increased, there are formed in the beam spot 58 a low-temperature area where the direction of magnetization of the reproducing layer 18 is an in-plane direction, an intermediate-temperature area where the magnetization of the recording layer 22 is transferred to the control layer 20' and the reproducing layer 18 by exchange bond, and a high-temperature area whose temperature is higher than the Curie temperature of the control layer 20' as shown in FIGS. 17A and 17B. In the low-temperature area in the beam spot 58, the direction of magnetization of the control layer 20' becomes a perpendicular direction due to the exchange bond to the recording layer 22; however, the easy axis of magnetization of the reproducing layer 18 remains in a plane, so that the in-plane mask 60 is formed.

In the intermediate-temperature area, the magnetization of the recording layer 22 is transferred to the control layer 20' by exchange bond, and the magnetization of the control layer 20' is transferred to the reproducing layer 18 by exchange bond, so that the opening 62 is formed. In the high-temperature area, the medium is heated to temperatures higher than the Curie temperature of the control layer 20', so that the magnetization of the control layer 20' disappears to cut off the magnetic bond between the reproducing layer 18 and the recording layer 22. Accordingly, the reproducing layer 18 is magnetized in the direction of the bias magnetic field Hr to form the up spin mask 68.

In the data reproducing method according to this preferred embodiment, even when the bias magnetic field Hr for reproduction is not applied, data can sometimes be reproduced. That is, in the high-temperature area whose temperature is higher than the Curie temperature Tc2 of the control layer 20', no exchange bond exists between the reproducing layer 18 and the recording layer 22. When a recorded mark in the reproducing layer 18 is very small, the direction of magnetization of the reproducing layer 18 becomes identical with the direction of magnetization around the mark. In other words, in the high-temperature area meeting T>Tc2, the mark transferred to the reproducing layer 18 undergoes the magnetic influence around the mark to spontaneously disappear. Thus, a mask is formed in the high-temperature area even with no use of the bias magnetic field for reproduction.

Accordingly, when a magneto-optical signal is differentially detected, the low-temperature area functions as a magneto-optical mask, and the high-temperature area also functions as a magneto-optical mask; however, information in the recording layer 22 is transferred to the reproducing layer 18 in the intermediate-temperature area. Thus, only the intermediate-temperature area formed between the two masks becomes an opening to allow the magnetically induced super resolution reproduction.

Figure 18:
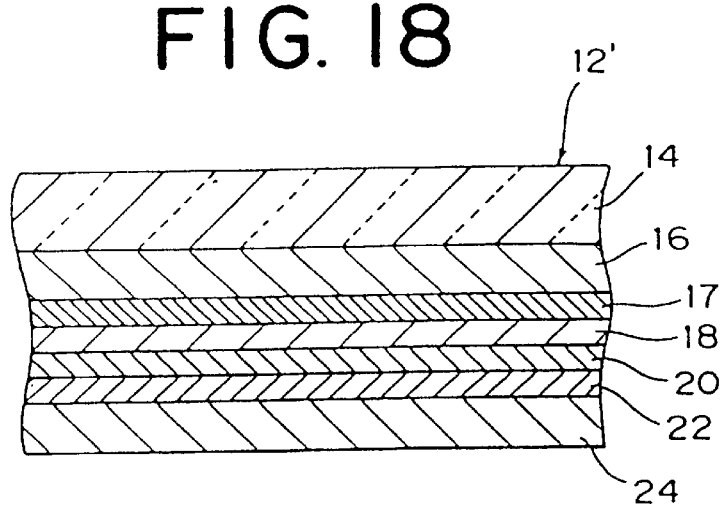
FIG. 18 is a vertical sectional view of a magneto-optical recording medium according to a fifth preferred embodiment of the present invention.

Referring to FIG. 18, there is shown the structure of a magneto-optical recording medium 12' according to a fifth preferred embodiment of the present invention. The magneto-optical recording medium 12' according to this preferred embodiment differs from the magneto-optical recording medium 12 according to the first preferred embodiment shown in FIG. 1 in the point that a magnetic reproduction assisting layer 17 is interposed between the dielectric layer 16 and the reproducing layer 18. The assisting layer 17 has an easy axis of magnetization in the perpendicular direction like the control layer 20 and the recording layer 22. The reproducing layer 18 has an easy axis of magnetization in a plane at room temperature. Preferably, the easy axis of magnetization of the reproducing layer 18 is changed to the perpendicular direction at temperatures higher than a given temperature to which the medium is heated by a reproducing beam power.

A Curie temperature Tc1 of the assisting layer 17, a Curie temperature Tc2 of the reproducing layer 18, a Curie temperature Tc3 of the control layer 20, and a Curie temperature Tc4 of the recording layer 22 are related to satisfy Tc1>Tc3, Tc2>Tc3, and Tc4>Tc3, preferably, Tc1>Tc4>Tc3 and Tc2>Tc4>Tc3.

The Curie temperature of the assisting layer 17 is made high in order to enlarge a reproduction signal output. The Curie temperature of the reproducing layer 18 is made high to some extent because the reproducing layer 18 has a large value of saturation magnetization at room temperature to become an in-plane magnetization film, while the layer 18 must become a perpendicular magnetization film at temperatures near the temperature to which the medium is heated by the reproducing power.

The Curie temperature of the control layer 20 is set lower than the Curie temperature of the recording layer 22 because the control layer 20 has a role of cutting off an exchange bonding force between the reproducing layer 18 and the recording layer 22 at temperatures near the temperature to which the medium is heated by the reproducing power. The Curie temperature of the recording layer 22 is set higher than the Curie temperature of the control layer 20 in order that a recorded signal in the recording layer 22 does not disappear even at temperatures near the temperature to which the medium is heated by the reproducing power.

Further, a coercive force Hc1 of the assisting layer 17 at room temperature, a coercive force Hc2 of the reproducing layer 18 at room temperature, a coercive force Hc3 of the control layer 20 at room temperature, and a coercive force Hc4 of the recording layer 22 are related to satisfy Hc4>Hc3 and Hc4>Hc1.

It is desired that the coercive force of the recording layer 22 is large at room temperature, because the direction of magnetization of the recording layer 22 must not be inverted by an external magnetic field. Accordingly, the coercive force of the recording layer 22 is the largest one of the coercive forces of all the layers. The coercive force of the assisting layer 17 is set small because the direction of magnetization of the assisting layer 17 must be inverted by a bias magnetic field. The coercive force of the control layer 20 must be set smaller than the coercive force of the recording layer 22 in order to perfectly exchange-bond the control layer 20 and the recording layer 22 at room temperature.

Preferably, the control layer 20 and the recording layer 22 are magnetically bonded so as to satisfy Hc3<σw/(2Ms3·h3), where Ms3 represents the value of saturation magnetization of the control layer 20, h3 represents the thickness of the control layer 20, and σw represents the domain wall energy between the control layer 20 and the recording layer 22. To ensure the perfect exchange bond between the control layer 20 and the recording layer 22, the satisfaction of this condition is desirable.

Figure 19:
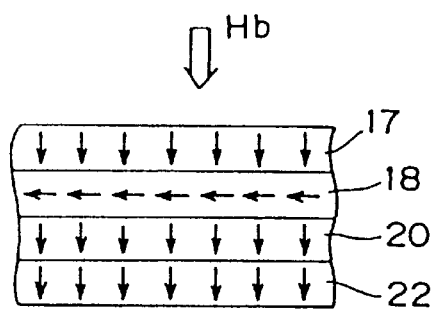
FIG. 19 is a vertical sectional view illustrating data erasing.

FIG. 19 shows a condition where data is erased from the recording medium according to the fifth preferred embodiment. That is, data is erased by directing a laser beam onto the magneto-optical recording medium 12' to heat the recording medium to temperatures higher than the Curie temperature of the recording layer 22, and applying a bias magnetic field Hb downward or upward. In FIG. 19, the arrows denoting the direction of magnetization of the reproducing layer 18 are directed leftward; however, the direction of the arrows is merely illustrative for convenience, and the direction of magnetization is not limited to a specific direction in a plane.

Figure 20:
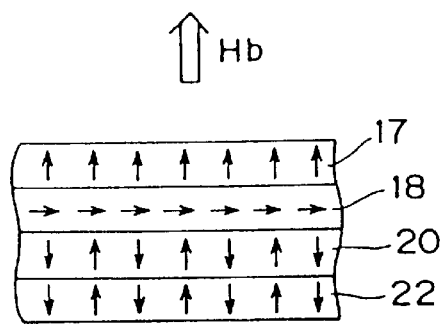
FIG. 20 is a vertical sectional view illustrating data writing.

FIG. 20 shows a condition where data is written on the magneto-optical recording medium by directing a laser beam having write power onto the medium as applying a bias magnetic field Hb in the direction opposite to the data erasing direction. That is, the bias magnetic field Hb is applied upward, and the recording medium is heated to temperatures near the Curie temperature of the recording layer 22, thereby upward directing the magnetization of the recording layer 22. At this time, the control layer 20 is heated to temperatures higher than its Curie temperature, so that the magnetization of the control layer 20 disappears. The directions of magnetization of the assisting layer 17 and the reproducing layer 18 become identical with the direction of the bias magnetic field Hb.

When the temperature of the medium lowers to a temperature less than the Curie temperature of the control layer 20, the control layer 20 is exchange-bonded to the recording layer 22, so that the magnetization of the control layer 20 is directed upward. When the temperature of the medium further lowers, the value of saturation magnetization of the reproducing layer 18 becomes large and the direction of magnetization of the layer 18 therefore becomes an in-plane direction. Accordingly, in a recording power irradiation area of the recording medium, the directions of magnetization of all the assisting layer 17, the control layer 20, and the recording layer 22 become upward.

In an area where recording is not performed (i.e., an area irradiated with power corresponding to the reproducing power), the medium is heated to temperatures higher than the Curie temperature of the control layer 20 by this laser power, so that the directions of magnetization of the assisting layer 17 and the reproducing layer 18 become upward. When the temperature of the medium lowers, the direction of magnetization of the assisting layer 17 remains upward, but the direction of magnetization of the reproducing layer 18 becomes an in-plane direction. Further, the directions of magnetization of the control layer 20 and the recording layer 22 become downward, which corresponds to a data erased condition.

Figure 21A:
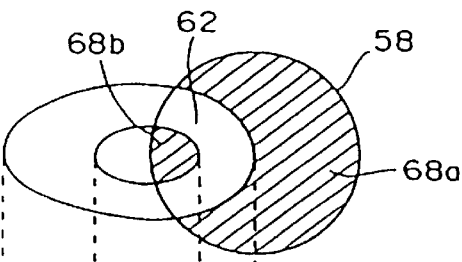
FIG. 21A is a plan view illustrating a data reproducing method according to the fifth preferred embodiment when a bias magnetic field is applied upward.
Figure 21B:
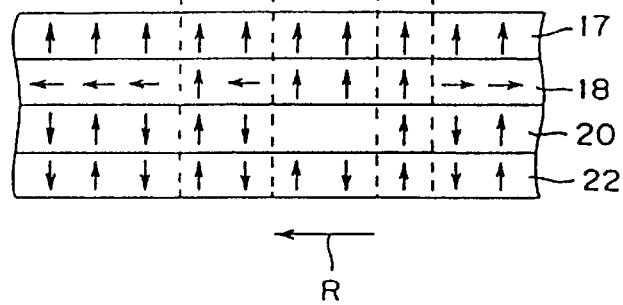
FIG. 21B is a vertical sectional view of the recording medium in the condition of FIG. 21A.

A data reproducing method according to the fifth preferred embodiment when applying a bias magnetic field Hr for reproduction in the upward direction, i.e., in the same direction as that of the bias magnetic field for recording will now be described with reference to FIGS. 21A and 21B. As shown in FIG. 21A, a beam spot 58 is formed on the recording medium, and a temperature distribution is accordingly formed in the beam spot 58. In a low-temperature area where the direction of magnetization of the reproducing layer 18 is an in-plane direction, the direction of magnetization of the assisting layer 17 becomes identical with the upward direction, i.e., the direction of the bias magnetic field Hr for reproduction, so that an upstream up spin mask 68a is formed in the beam spot 58.

In an intermediate-temperature area where the reproducing layer 18 is exchange-bonded to the control layer 20, the recording layer 22 and the control layer 20 are exchange-bonded together, and the reproducing layer 18 and the assisting layer 17 are also exchange-bonded together. As a result, the magnetization of the recording layer 22 is transferred to the assisting layer 17. That is, an opening 62 for data reading is formed in the beam spot 58. In a high-temperature area heated to temperatures higher than the Curie temperature of the control layer 20, the magnetization of the control layer 20 disappears, and the directions of magnetization of the assisting layer 17 and the reproducing layer 18 become upward, so that a downstream up spin mask 68b is formed in the beam spot 58.

When the area of the medium irradiated with the laser beam is moved away from the beam spot 58 to lower the temperature of the medium down to temperatures lower than the Curie temperature of the control layer 20, the direction of magnetization of the assisting layer 17 remains upward, but the direction of magnetization of the reproducing layer 18 becomes an in-plane direction. Further, the directions of magnetization of the control layer 20 and the recording layer 22 become identical with those in the recorded condition. In this manner, the low-temperature area, the intermediate-temperature area, and the high-temperature area are formed, and the opening 62 is formed in the intermediate-temperature area by appropriately controlling the reproducing power. Further, the upstream up spin mask 68a and the downstream up spin mask 68b are formed in the low-temperature area and the high-temperature area, respectively. As a result, a magneto-optical signal can be read through only the intermediate-temperature area, thus allowing the magnetically induced super resolution reproduction.

Figure 22A:
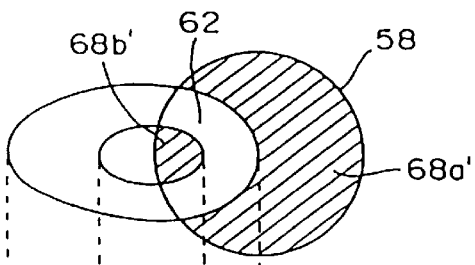
FIG. 22A is a plan view illustrating a data reproducing method according to the fifth preferred embodiment when a bias magnetic field is applied downward.
Figure 22B:
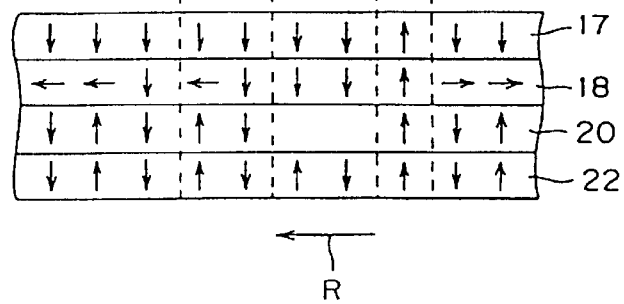
FIG. 22B is a vertical sectional view of the recording medium in the condition of FIG. 22A.

FIGS. 22A and 22B show a data reproducing method according to the fifth preferred embodiment when downward applying the bias magnetic field Hr for reproduction. As similar to the case of FIGS. 21A and 21B, the magnetically induced super resolution reproduction is allowed also in this case. However, in this case, an upstream down spin mask 68a' and a downstream down spin mask 68b' are formed in the beam spot 58. Further, an opening 62 is similarly formed in the intermediate-temperature area.

In the magneto-optical recording media according to the first to fourth preferred embodiments, a transition area where the direction of magnetization of the reproducing layer 18 is changed from the in-plane direction to the perpendicular direction at the boundary between the in-plane mask 60 and the opening 62 is relatively wide to cause an increase in noise, with the result that the C/N of reproduction output does not become so large. To the contrary, in the magneto-optical recording medium according to the fifth preferred embodiment shown in FIG. 18, a transition area where the upward direction of magnetization of the assisting layer 17 for reproducing recorded information is inverted to the downward direction is narrow because the assisting layer 17 is a perpendicular magnetization film, thereby reducing the noise to improve the C/N of reproduction output.

Figure 23:
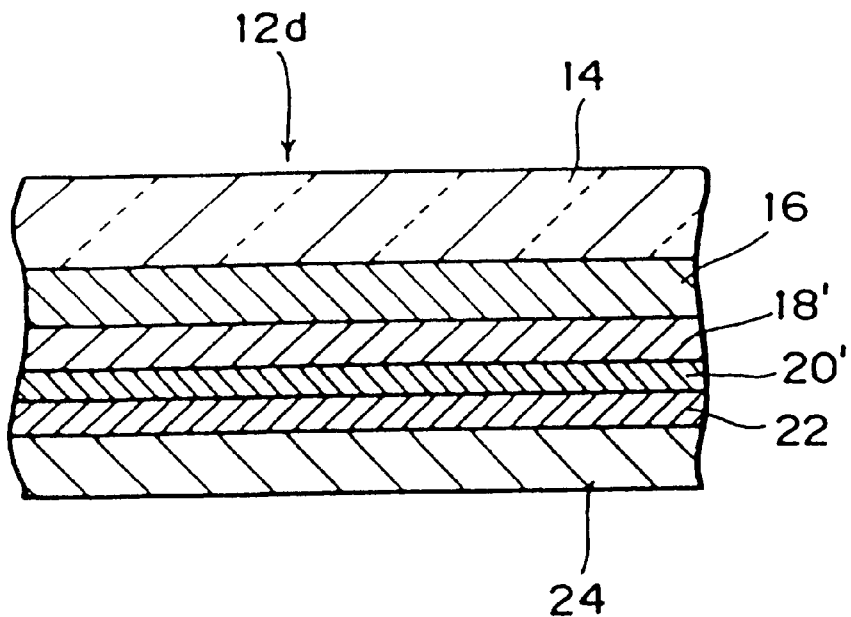
FIG. 23 is a vertical sectional view of a magneto-optical recording medium according to a sixth preferred embodiment of the present invention.

Referring to FIG. 23, there is shown the structure of a magneto-optical recording medium 12d according to a sixth preferred embodiment of the present invention. In the following description of this preferred embodiment, the same parts as those in the first to fifth preferred embodiments mentioned above are denoted by the same reference numerals, and the explanation thereof will be omitted to avoid repetition. A magnetic reproducing layer 18' formed from a rare earth-transition metal amorphous alloy film such as GdFeCo is laminated on the dielectric layer 16. The reproducing layer 18' has an easy axis of magnetization perpendicular to the substrate 14.

A magnetic control layer 20' formed from a rare earth-transition metal amorphous alloy film such as GdFeCo is laminated on the reproducing layer 18'. The control layer 20' has an easy axis of magnetization in a plane at room temperature. Preferably, the easy axis of magnetization of the control layer 20' is changed from the in-plane direction to the perpendicular direction at temperatures higher than a given temperature to which the medium is heated by a reproducing beam power. A Curie temperature Tc1 of the reproducing layer 18', a Curie temperature Tc2 of the control layer 20', and a Curie temperature Tc3 of the recording layer 22 are related to satisfy Tc1>Tc2 and Tc3>Tc2.

Further, a coercive force Hc1 of the reproducing layer 18' at room temperature and a coercive force Hc3 of the recording layer 22 at room temperature are related to satisfy Hc3>Hc1. The reproducing layer 18' may be formed from an amorphous alloy film containing Tb, Gd, Fe, and Co, and the control layer 20' may be formed from an amorphous alloy film containing Gd and Fe. Preferably, the control layer 20' further contains a nonmagnetic material selected from the group consisting of Si, Al, and Ti.

Figure 24:
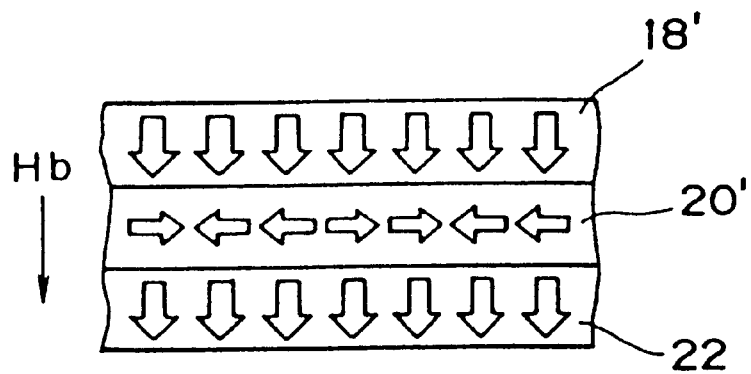
FIG. 24 is a vertical sectional view illustrating data erasing.

A data erasing method according to this preferred embodiment will now be described with reference to FIG. 24. A bias magnetic field Hb is applied downward, and a laser beam is directed onto the recording medium to heat the medium to temperatures higher than the Curie temperature of the recording layer 22, thereby downward directing the magnetization of the recording layer 22. When the laser beam is removed, the temperature of the recording medium lowers to room temperature. At room temperature, the control layer 20' becomes an in-plane magnetization film, and the reproducing layer 18' is not magnetically bonded to the recording layer 22. Accordingly, the direction of magnetization of the reproducing layer 18' is made downward by a small magnetic field like an erasing bias magnetic field.

Figure 25:
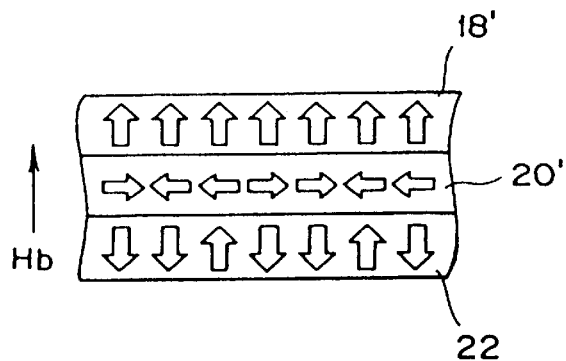
FIG. 25 is a vertical sectional view illustrating data writing.

A data writing method according to this preferred embodiment will now be described with reference to FIG. 25. The bias magnetic field Hb is applied in the direction opposite to the erasing direction, i.e., in the upward direction, and a strong laser beam is directed onto only a recording portion of the medium, thereby upward directing the magnetization of the recording layer 22 at only the recording portion. When the laser beam is removed, the temperature of the recording medium lowers to room temperature. At room temperature, the control layer 20' becomes an in-plane magnetization film, and the reproducing layer 18' is not magnetically bonded to the recording layer 22. Accordingly, the direction of magnetization of the reproducing layer 18' is made upward by a small magnetic field like a bias magnetic field.

Figure 26A:
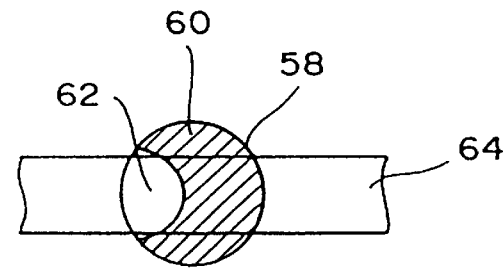
FIG. 26A is a plan view illustrating a single-masked reproducing method.
Figure 26B:
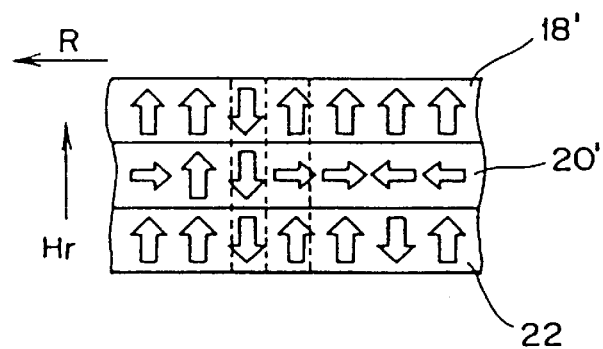
FIG. 26B is a vertical sectional view of the recording medium in the condition of FIG. 26A.

A single-masked reproducing method according to this preferred embodiment will now be described with reference to FIGS. 26A and 26B. There are formed in the beam spot 58 directed onto the track 64 a low-temperature area whose temperature is lower than Tcopy and a high-temperature area whose temperature is higher than Tcopy and lower than the Curie temperature Tc2 of the control layer 20'. An up spin mask 60 is formed in the low-temperature area in the beam spot 58, and an opening 62 is formed in the high-temperature area in the beam spot 58. This condition is similar to the data reproduction condition in Japanese Patent Laid-open No. 5-81717 mentioned above, and a magneto-optical signal can be read through the opening 62.

Figure 27A:
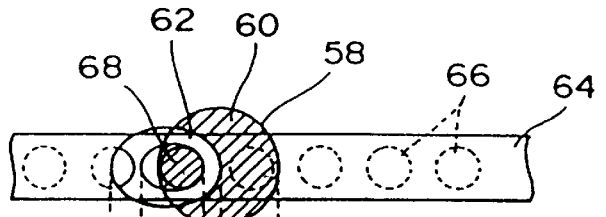
FIG. 27A is a plan view illustrating a data reproducing method according to the sixth preferred embodiment.
Figure 27B:
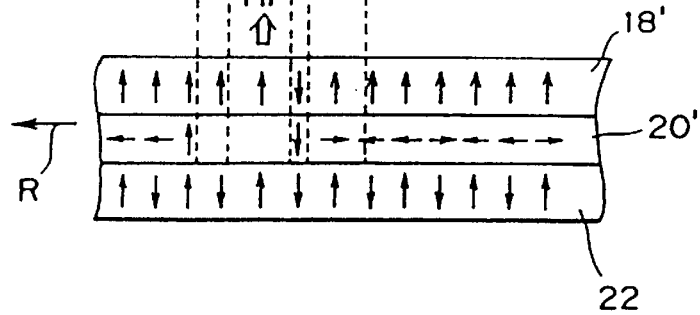
FIG. 27B is a vertical sectional view of the recording medium in the condition of FIG. 27A.

When the reproducing laser power is further increased, there are formed in the beam spot 58 a low-temperature area where the direction of magnetization of the reproducing layer 18' is identical with the direction of the reproducing bias magnetic field Hr, an intermediate-temperature area where the magnetization of the recording layer 22 is transferred to the control layer 20' and the reproducing layer 18' by exchange bond, and a high-temperature area whose temperature is higher than the Curie temperature Tc2 of the control layer 20' as shown in FIGS. 27A and 27B. In the low-temperature area and the high-temperature area, up spin masks 60 and 68 where the direction of magnetization of the reproducing layer 18' is made identical with the direction of the bias magnetic field Hr are formed, respectively.

In the up spin mask 68, the recording medium is heated to temperatures higher than the Curie temperature Tc2 of the control layer 20', so that the magnetization of the control layer 20' disappears and the reproducing layer 18' is not magnetically bonded to the recording layer 22. Accordingly, the direction of magnetization of the reproducing layer 18' is made identical with the direction of magnetization of the bias magnetic field Hr because of its small coercive force at room temperature. That is, in the high-temperature area whose temperature is higher than the control layer 20', the magnetization of the reproducing layer 18' is directed always upward, so that the reproducing layer 18' functions as a kind of mask to hinder outputting of a magneto-optical signal. Accordingly, the opening 62 having a very small size as compared with that obtained by the conventional method described in Japanese Patent Laid-open No. 5-81717 can be formed. In addition, since the opening 62 is formed at the central portion of the beam spot larger in laser intensity than at the peripheral portion of the beam spot, a large magneto-optical signal output can be obtained.

EXAMPLE 1

Targets of TbFeCo, TbFe, GdFeCo, and Si and a polycarbonate substrate having a track pitch of 1.3 $\mu$m were set in a sputtering device, and a chamber of the sputtering device was evacuated to $10^{-5}$ Pa. Then, a silicon nitride (SiN) film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.2 Pa sputter gas: Ar, $N_2$ pressure ratio: Ar:$N_2$=7:3 applied power: 0.8 kW

Then, the chamber was evacuated to $10^{-5}$ Pa again, and the films of GdFeCo, TbFe, and TbFeCo were continuously formed in this order on the SiN film by DC sputtering under the following conditions.

gas pressure: 0.5 Pa sputter gas: Ar applied power: 1 kW

The composition, thickness, and magnetic characteristics of each magnetic layer are shown in Table 1.

TABLE 1

| | Composition | Thickness (nm) | Curie Temp. | Compensation Temp. | Dominant |
|---|---|---|---|---|---|
| Reproducing Layer | $Gd_{29}Fe_{55}Co_{16}$ | 40 | 330° C. | 220° C. | RE rich |
| Control Layer | $Tb_{17}Fe_{83}$ | 8 | 140° C. | — | TM rich |
| Recording Layer | $Tb_{19}Fe_{73}Co_8$ | 40 | 220° C. | — | TM rich |

In Table 1, RE represents rare earth, and TM represents transition metal. Further, a silicon nitride film having a thickness of 100 nm was formed as a protective layer on the recording layer by a method similar to the above method. This silicon nitride film serves to protect the magnetic film from oxidation.

The recording characteristic of the magneto-optical disk thus produced was examined by using the drive unit shown in FIG. 4. The wavelength of laser used is 780 nm. First, all data recorded on the magneto-optical disk were erased, that is, the magneto-optical disk was initialized. At this time, the laser power was set to 9 mW, and a bias magnetic field was applied upward. The recording of information was performed by applying a bias magnetic field in the direction opposite to that in the initialization, i.e., in the downward direction as rotating the disk at a linear velocity of 3 m/sec and directing a laser beam onto the disk with a recording power of 4 mW, frequency of 7.5 MHz, and an emission duty ratio of 26%. As the result, a mark having a length of about 0.4 μm was recorded on the disk.

The reproducing characteristic of the magneto-optical disk was next examined. In this case, a bias magnetic field for reproduction was applied upward. With a reproducing power of 1.5 mW, no magneto-optical signal output for a previously recorded signal was obtained. This is considered to be due to the fact that an in-plane mask was formed in the whole area in the beam spot. With a reproducing power of 1.6 mW, the magnetization of the recording layer 22 was transferred through the control layer 20 to the reproducing layer 18 to obtain a magneto-optical signal output. This is considered to be due to the fact that an area having temperatures higher than the temperature at which the magnetization of the recording layer 22 is transferred to the reproducing layer 18 was formed in the beam spot to form the in-plane mask 60 and the opening 62. A signal-to-noise ratio (C/N) at this time was 35 dB.

With a reproducing power of 1.7 mW, there were formed in the beam spot a low-temperature area where the direction of magnetization of the reproducing layer 18 is an in-plane direction, an intermediate-temperature area where the magnetization of the recording layer 22 is transferred through the control layer 20 to the reproducing layer 18 by exchange bond, and a high-temperature area whose temperature is higher than the Curie temperature of the control layer 20. In the low-temperature area, the in-plane mask 60 was formed. In the high-temperature area, the direction of magnetization of the reproducing layer 18 was made identical with the direction of the bias magnetic field, i.e., the upward direction, to form the up spin mask 68 in the beam spot. Further, the opening 62 allowing a magneto-optical signal to be output was formed between the in-plane mask 60 and the up spin mask 68 in the beam spot. As the result, a C/N value of 42 dB was obtained.

EXAMPLE 2

A magneto-optical disk having the same structure as that in Example 1 except the composition of the control layer 20 was prepared by the same method as that in Example 1. The composition of the control layer 20 was set to $Dy_{30}Fe_{70}$. The control layer 20 has a Curie temperature of about 150° C., and it is an in-plane magnetization film at room temperature. The recording characteristic of this magneto-optical disk was examined. Measurement was made under the same conditions as those in Example 1. As the result, with a reproducing power of 1.7 mW, there were formed in the beam spot a low-temperature area, an intermediate-temperature area, and a high-temperature area whose temperature is higher than the Curie temperature of the control layer 20.

In the low-temperature area, the in-plane mask 60 was formed. In the high-temperature area, the direction of magnetization of the reproducing layer 18 was made identical with the direction of the bias magnetic field, i.e., the upward direction, to form the up spin mask 68 in the beam spot. Further, the opening 62 allowing a magneto-optical signal to be output was formed between the in-plane mask 60 and the up spin mask 68 in the beam spot. As the result, a C/N value of 42 dB was obtained.

EXAMPLE 3

Plural magneto-optical disks were prepared by changing the thickness of an SiN film in the range of 1 nm to 10 nm as the nonmagnetic intermediate layer 26 interposed between the reproducing layer 18 and the control layer 20 of the magneto-optical disk having the same structure as that of the medium in Example 1. Measurement of the recording characteristic was made under the same conditions as those in Example 1. As the result, it was found that when the intermediate layer having the thickness in the above range was used, the reproducing layer 18 and the control layer 20 were magnetostatically bonded together by a leaked magnetic field of the recording layer 22. As similar to Example 1, no magneto-optical signal output was obtained with a reproducing power of 1.5 mW. With a reproducing power of 1.6 mW, an opening was formed at the downstream portion in the beam spot to obtain 37 dB as a magneto-optical signal output. With a reproducing power of 1.8 mW, 47 dB was obtained. Further, also when the nonmagnetic intermediate layer 26 having a thickness in the range of 1 nm to 10 nm was interposed between the control layer 20 and the recording layer 22, a magneto-optical signal output of 47 dB was obtained with a reproducing power of 1.8 mW.

EXAMPLE 4

Targets of TbFeCo, GdFeCo, GdFe, and Si and a polycarbonate substrate having a track pitch of 1.2 μm were set in a sputtering device, and a chamber of the sputtering device was evacuated to $10^{-5}$ Pa. Then, a silicon nitride (SiN) film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.3 Pa sputter gas: Ar, $N_2$ pressure ratio: $Ar:N_2=6:4$ applied power: 0.8 kW Then, the chamber was evacuated to $10^{-5}$ Pa again, and the films of GdFeCo, GdFe, and TbFeCo were continuously formed in this order on the SiN film by DC sputtering under the following conditions.

gas pressure: 0.5 Pa
sputter gas: Ar
applied power: 1 kW

The composition, thickness, and magnetic characteristics of each magnetic layer are shown in Table 2.

TABLE 2

|  | Composition | Thickness (nm) | Curie Temp. | Compensation Temp. | Dominant |
|---|---|---|---|---|---|
| Reproducing Layer | $Gd_{39}Fe_{37}Co_{17}$ | 40 | 300° C. | — | RE rich |
| Control Layer | $Gd_{30}Fe_{70}$ | 12 | 190° C. | — | RE rich |
| Recording Layer | $Tb_{19}Fe_{73}Co_8$ | 50 | 220° C. | — | TM rich |

Further, a silicon nitride film having a thickness of 100 nm was formed as a protective layer on the recording layer by a method similar to the above method. This silicon nitride film serves to protect the magnetic film from oxidation.

The recording characteristic of the magneto-optical disk thus produced was examined by using the drive unit shown in FIG. 4. The wavelength of laser used is 780 nm. First, all data recorded on the magneto-optical disk were erased, that is, the magneto-optical disk was initialized. At this time, the laser power was set to 9 mW, and a bias magnetic field was applied downward. The recording of information was performed by applying a bias magnetic field in the direction opposite to that in the initialization, i.e., in the upward direction as rotating the disk at a linear velocity of 3 m/sec and directing a laser bean onto the disk with a recording power of 4 mW, a frequency of 7.5 MHz, and an emission duty ratio of 26%. As the result, a mark having a length of about 0.4 μm was recorded on the disk.

The reproducing characteristic of the magneto-optical disk was next examined. In this case, a bias magnetic field for reproduction was applied downward. The magnitude of the bias magnetic field for reproduction was set to 300 Oe. With a reproducing power of 1.5 mW, no magneto-optical signal output for a previously recorded signal was obtained. This is considered to be due to the fact that an in-plane mask was formed in the whole area in the beam spot. With a reproducing power of 1.6 mW, the magnetization of the recording layer 22 was transferred through the control layer 20' to the reproducing layer 18 to obtain a magneto-optical signal output. This is considered to be due to the fact that an area having temperatures higher than the temperature at which the magnetization of the recording layer 22 is transferred through the control layer 20' to the reproducing layer 18 was formed in the beam spot to form the in-plane mask 60 and the opening 62. A signal-to-noise ratio (C/N) at this time was 42 dB.

With a reproducing power of 1.7 mW, the direction of magnetization of the reproducing layer 18 in a low-temperature area in the beam spot was made identical with an in-plane direction, and the diameter of an area (opening) where the reproducing layer 18 and the control layer 20' are exchange-bonded to the recording layer 22 became about 0.4 μm, thereby obtaining a C/N value of 45 dB. When the reproducing power was increased to 2 mW, there were formed in the beam spot a low-temperature area where the direction of magnetization of the reproducing layer 18 is an in-plane direction, an intermediate-temperature area where the magnetization of the recording layer 22 is transferred through the control layer 20' to the reproducing layer 18 by exchange bond, and a high-temperature area whose temperature is higher than the Curie temperature of the control layer 20'. In the low-temperature area, the in-plane mask 60 was formed. In the high-temperature area, the direction of magnetization of the reproducing layer 18 was made identical with the direction of the bias magnetic field, i.e., the downward direction, to form the down spin mask 68' in the beam spot. Further, the opening 62 allowing a magneto-optical signal to be output was formed between the in-plane mask 60 and the down spin mask 68' in the beam spot. As the result, a (C/N value of 47 db was obtained.

A change in C/N with respect to the reproducing magnetic field was next examined. As the result, even when no reproducing magnetic field was applied, a C/N value of 46.5 dB was obtained. This is considered to be due to the fact that an area of the reproducing layer 18 (magnetization inverted area) to which the mark in the recording layer 22 had been transferred was heated to disappear in the high-temperature area whose temperature was higher than the Curie temperature of the control layer 20'. This is considered to be caused by a small magnetic anisotropy of GdFeCo used for the reproducing layer 18.

EXAMPLE 5

The composition of the reproducing layer 18 was examined by determining whether RE rich (which means that the magnetic moment of rare earth metal is predominant over the magnetic moment of transition metal) or TM rich (which means that the magnetic moment of transition metal is predominant over the magnetic moment of rare earth metal) is suitable for the composition of the reproducing layer 18. In this test, plural magneto-optical disks were prepared by changing X in $Gd_X(FeCo)_{100-X}$ as the composition of the reproducing layer 18 and forming the other magnetic layers under the same conditions as those in Example 4. Then, the reproducing characteristics of these magneto-optical disks were examined. Evaluation of the reproducing characteristics were made under the same conditions as those in Example 4. The results are shown in Table 3.

TABLE 3

| X | Dominant | C/N (Hr: 0) | C/N (Hr: 300 Oe) |
|---|---|---|---|
| 25 | TM | 25 | 35 |
| 26 | RE | 43 | 45 |
| 30 | RE | 46.5 | 47 |
| 35 | RE | 44 | 45 |
| 37 | RE | 35 | 37 |

As apparent from Table 3, the content of Gd in the composition of GdFeCo for the reproducing layer 18 is preferably in the range of 26 at % to 35 at %. Further, it was found that RE rich is effective for the composition of the reproducing layer 18.

EXAMPLE 6

The composition of the reproducing layer 18 was examined. A TbFeCo film or a DyFeCo film used as a reproducing layer in a usual magneto-optical disk did not satisfy the conditions required for executing the principle of the present invention. That is, the composition providing a change from an in-plane magnetization film to a perpendicular magnetization film at temperatures near 100° C. was not found in such an amorphous alloy film. Accordingly, GdFeCo is suitable for the composition of the reproducing layer 18.

EXAMPLE 7

The composition of the control layer 20' was examined. Firstly, the temperature at which an in-plane magnetization film is changed to a perpendicular magnetization film was examined by changing X in $Gd_XFe_{100-X}$ as the composition of the control layer 20'. The results are shown in Table 4. In this test, the magnetic film was formed on a quartz glass by sputtering. The forming conditions are as follows:

gas pressure: 0.5 Pa
sputter gas: Ar
applied power: 1 kW

TABLE 4

| X | 24 | 25 | 26 | 30 | 35 | 37 |
|---|---|---|---|---|---|---|
| Tp(° C.) | −30 | 30 | 70 | 100 | 150 | 180 |

As apparent from Table 4, the content of Gd in the composition of GdFe for the control layer 20' is preferably in the range of 26 at % to 35 at %. Secondly, rare earth metals to be used in the control layer 20' were examined. As the result, the Curie temperature of TbFe was near 150° C., and the composition providing a change from an in-plane magnetization film to a perpendicular magnetization film at temperatures near 100° C. was not found in TbFe.

The Curie temperature of DyFe was lower than 100° C.; however, the Curie temperature of $Dy_{23}Gd_7Fe_{70}$ was near 130° C. and this composition provided a change from an in-plane magnetization film to a perpendicular magnetization film at temperatures near 80° C. Thus, it was found that this composition is suitable for a magnetic super resolution magneto-optical disk. In summary, it was found that it is very effective to contain Gd and Fe, or Dy and Fe as the composition of the control layer 20'. Next, a nonmagnetic metal was added to GdFe as the composition of the control layer 20'. The addition of the nonmagnetic metal is intended to lower the Curie temperature of the control layer 20' and thereby narrow the temperature range of the opening where the magnetization of the recording layer 22 is transferred through the control layer 20' to the reproducing layer 18.

EXAMPLE 8

Plural magneto-optical disks were prepared by the same method as that in Example 1 with the composition of the control layer 20' set to $(Gd_{30}Fe_{70})_{80}Ng_{20}$, where Ng represents nonmagnetic metals. The characteristics of the magneto-optical disks are shown in Table 5.

TABLE 5

| Ng | Si | Ti | Al | Cu |
|---|---|---|---|---|
| C/N | 48 | 47 | 47 | 39 |

As apparent from Table 5, it is effective to add the nonmagnetic material to the control layer 20'.

EXAMPLE 9

The amount of Si to be added to the control layer 20' was examined. The compositions and thicknesses of the reproducing layer 18, the control layer 20', and the recording layer 22 were set to the same as those in Example 4. That is, the composition of the control layer 20' was set to $Gd_{30}Fe_{70}$. In this example, Si was added to the control layer 20' having this composition. The amount of Si to be added was changed by changing the number of Si chips to be placed on a GdFe target for the control layer 20'. The results are shown in Table 6.

TABLE 6

| Si (at %) | 0 | 5 | 10 | 20 | 30 | 40 | 50 | 60 | 70 |
|---|---|---|---|---|---|---|---|---|---|
| C/N | 47 | 47 | 47 | 48 | 48 | 49 | 49 | 48 | 40 |

As apparent from Table 6, when the content of Si is in the range of 0 at % to 60 at %, high C/N values can be obtained. When the content of Si is 70 at % or higher, C/N is decreased because the exchange bonding force between the reproducing layer 18 and the recording layer 22 is small.

EXAMPLE 10

Targets of TbFeCo, TbFe, first GdFeCo, second GdFeCo, and Si and a polycarbonate substrate having a track pitch of 1.2 μm were set in a sputtering device, and a chamber of the sputtering device was evacuated to $10^{-5}$ Pa. Then, a silicon nitride (SiN) film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.2 Pa
sputter gas: Ar, $N_2$
pressure ratio: Ar:$N_2$=7:3
applied power: 0.8 kW Then, the chamber was evacuated to $10^{-5}$ Pa again, and the films of first GdFeCo, second GdFeCo, TbFe, and TbFeCo were continuously formed in this order on the SiN film by DC sputtering under the following conditions.

gas pressure: 0.5 Pa
sputter gas: Ar
applied power: 1 kW

The composition, thickness, and magnetic characteristics of each magnetic layer are shown in Table 7.

TABLE 7

| | Composition | Thickness (nm) | Curie Temp. | Dominant | Coercive Force |
|---|---|---|---|---|---|
| Assisting Layer | $Gd_{20}Fe_{54}Co_{26}$ | 40 | 360° C. | TM rich | 200 Oe |
| Reproducing Layer | $Gd_{39}Fe_{37}Co_{24}$ | 12 | 330° C. | RE rich | — |
| Control Layer | $Tb_{17}Fe_{83}$ | 10 | 140° C. | TM rich | 2 kOe |
| Recording Layer | $Tb_{19}Fe_{73}Co_8$ | 40 | 220° C. | TM rich | 15 kOe |

The coercive forces Hc1, Hc2, Hc3, and Hc4 of the assisting layer, the reproducing layer, the control layer, and the recording layer are related to satisfy Hc4>Hc1 and Hc4>Hc3. Further, a silicon nitride film having a thickness of 100 nm was formed as the protective film 24 on the recording layer 22 by DC sputtering.

The recording characteristic of the magneto-optical disk thus produced was examined. The wavelength of laser used is 780 nm. First, all data recorded on the magneto-optical disk were erased, that is, the magneto-optical disk was initialized. At this time, the laser power was set to 9 mW, and a bias magnetic field was applied downward. The recording of information was performed by upward applying a bias magnetic field for recording as rotating the disk at a linear velocity of 3 m/sec and directing a laser beam onto the disk with a recording power of 4 mW, a frequency of 7.5 MHz, and an emission duty ratio of 26%. As the result, a mark having a length of about 0.4 μm was recorded on the disk.

The reproducing characteristic of the magneto-optical disk was next examined. In this case, a bias magnetic field for reproduction was applied upward. With a reproducing power of 1.5 mW, no magneto-optical signal output for a previously recorded signal was obtained. This is considered to be due to the fact that an up spin mask was formed in the whole area of the assisting layer 17 in the beam spot. With a reproducing power of 1.6 mW, the magnetization of the recording layer 22 was transferred through the control layer 20 and the reproducing layer 18 to the assisting layer 17 to obtain a magneto-optical signal output. This is considered to be due to the fact that an intermediate-temperature area where the magnetization of the recording layer 22 is transferred to the reproducing layer 18 was formed in the beam spot to form an up spin mask and an opening. A signal-to-noise ratio (C/N) at this time was 44 dB.

With a reproducing power of 1.7 mW, there were formed in the beam spot a low-temperature area where the direction of magnetization of the reproducing layer 18 is an in-plane direction, an intermediate-temperature area where the magnetization of the recording layer 22 is transferred through the control layer 20 and the reproducing layer 18 to the assisting layer 17 by exchange bond, and a high-temperature area whose temperature is higher than the Curie temperature of the control layer 20. In the low-temperature area and the high-temperature area, the direction of magnetization of the assisting layer 17 was made identical with the direction of the bias magnetic field, i.e., the upward direction, to form the upstream up spin mask 68a and the downstream up spill mask 68b in the beam spot, respectively. Further, the opening 62 allowing a magneto-optical signal to be output was formed between the upstream up spin mask 68a and the downstream up spin mask 68b in the beam spot. As the result, a C/N value of 49 dB was obtained.

EXAMPLE 11

A magneto-optical disk was prepared by changing the composition and Curie temperature of the assisting layer 17 of the magneto-optical disk in Example 10 and unchanging the other conditions. That is, the composition of the assisting layer 17 was changed to $Gd_{23}Fe_{58}Co_{19}$, and the Curie temperature of the assisting layer 17 was changed to 300° C. The reproducing characteristic of the magneto-optical disk thus prepared was measured under the same conditions as those in Example 10 to obtain an output of 49 dB with a reproducing power of 1.8 mW.

EXAMPLE 12

The composition of the reproducing layer 18' was examined. Targets of TbFeCo, first GdFeCo, second GdFeCo, and Si and a polycarbonate substrate having a track pitch of 1.2 μm were set in a sputtering device, and a chamber of the sputtering device was evacuated to $10^{-5}$ Pa. Then, a silicon nitride (SiN) film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.3 Pa
sputter gas: Ar, $N_2$
pressure ratio: Ar:$N_2$=6:4
applied power: 0.8 kW Then, the chamber was evacuated to $10^{-5}$ Pa again, and the films of first GdFeCo, second GdFeCo, and TbFeCo were continuously formed in this order on the SiN film by DC sputtering under the following conditions.

gas pressure: 0.5 Pa
sputter gas: Ar
applied power: 1 kW

The composition, thickness, and magnetic characteristics of each magnetic layer are shown in Table 8.

TABLE 8

|  | Composition | Thickness (nm) | Curie Temp. | Compensation Temp. | Dominant |
| --- | --- | --- | --- | --- | --- |
| Reproducing Layer | $Gd_{20}Fe_{54}Co_{26}$ | 40 | 360° C. | — | TM rich |
| Control Layer | $Gd_{39}Fe_{56}Co_5$ | 12 | 210° C. | — | RE rich |
| Recording Layer | $Tb_{19}Fe_{73}Co_8$ | 50 | 220° C. | — | TM rich |

Further, a silicon nitride film having a thickness of 100 nm was formed as a protective layer on the recording layer by a method similar to the above method. This silicon nitride film serves to protect the magnetic film from oxidation.

The recording characteristic of the magneto-optical disk thus produced was examined by using the drive unit shown in FIG. 4. The wavelength of laser used is 780 nm. First, all data recorded on the magneto-optical disk were erased, that is, the magneto-optical disk was initialized. At this time, the laser power was set to 9 mW, and a bias magnetic field was applied downward. The recording of information was performed by applying a bias magnetic field in the direction opposite to that in the initialization, i.e., in the upward direction as rotating the disk at a linear velocity of 3 m/sec and directing a laser beam onto the disk with a recording power of 4 mW, a frequency of 7.5 MHz, and an emission duty ratio of 26%. As the result, a mark having a length of about 0.4 μm was recorded on the disk.

The reproducing characteristic of the magneto-optical disk was next examined. In this case, a bias magnetic field for reproduction was applied upward. With a reproducing power of 1.5 mW, no magneto-optical signal output for a previously recorded signal was obtained. This is considered to be due to the fact that an up spin mask was formed in the whole area of the reproducing layer 18' in the beam spot. With a reproducing power of 1.6 mW, the magnetization of the recording layer 22 was transferred through the control layer 20' to the reproducing layer 18' to obtain a magneto-optical signal output. This is considered to be due to the fact that an area having temperatures higher than the temperature at which the magnetization of the recording layer 22 is transferred through the control layer 20' to the reproducing layer 18' was formed in the beam spot to form an up spill mask and an opening. A signal-to-noise ratio (C/N) at this time was 42 dB.

With a reproducing power of 1.7 mW, the direction of magnetization of the recording layer 22 was made identical with the direction of the bias magnetic field, i.e., the upward direction, and the diameter of an area (opening) where the control layer 20' is exchange-bonded to the recording layer 22 became about 0.4 μm to obtain a C/N value of 46 dB. Further, examination was made as to whether any other compositions for the reproducing layer 18' is satisfactory for use. When TbFeCo or DyFeCo was used as the composition of the reproducing layer 18', the magnetization of the reproducing layer 18' could not be initialized by the bias magnetic field because of a large coercive force of the above material. As a result, super resolution reproduction could not be effected.

EXAMPLE 13

In Example 12, a GdFeCo film was used as the reproducing layer 18'. However, the composition margin of the GdFeCo film showing perpendicular magnetic anisotropy is not wide, and composition control is sometimes difficult. From this point of view, it was tried to add a small amount of Tb capable of increasing the perpendicular magnetic anisotropy to GdFeCo in Example 13. The test was performed in the following manner. Targets of TbFeCo, TbGdFeCo, GdFeCo, and Si and a polycarbonate substrate having a track pitch of 1.2 μm were set in a sputtering device, and a chamber of the sputtering device was evacuated to $10^{-5}$ Pa. Then, a silicon nitride (SiN) film having a thickness of 70 nm was formed on the substrate by DC sputtering under the following conditions. This film serves not only to protect the magnetic film from oxidation, but also to exhibit an enhance effect such that a magneto-optical signal is enhanced.

gas pressure: 0.3 Pa sputter gas: Ar, $N_2$ pressure ratio: Ar:$N_2$=6:4 applied power: 0.8 kW

Then, the chamber was evacuated to $10^{-5}$ Pa again, and the films of TbGdFeCo, GdFeCo, and TbFeCo were continuously formed in this order on the SiN film by DC sputtering under the following conditions.

gas pressure: 0.5 Pa sputter gas: Ar applied power: 1 kW

The composition, thickness, and magnetic characteristics of each magnetic layer are shown in Table 9.

TABLE 9

| | Composition | Thickness (nm) | Curie Temp. | Compensation Temp. | Dominant |
|---|---|---|---|---|---|
| Reproducing Layer | $Tb_2Gd_{18}Fe_{54}Co_{26}$ | 40 | 350° C. | — | TM rich |
| Control Layer | $Gd_{39}Fe_{56}Co_5$ | 12 | 210° C. | — | RE rich |
| Recording Layer | $Tb_{19}Fe_{73}Co_8$ | 50 | 220° C. | — | TM rich |

Further, a silicon nitride film having a thickness of 100 nm was formed as a protective layer on the recording layer by a method similar to the above method. This silicon nitride film serves to protect the magnetic film from oxidation.

The reproducing characteristic of the magneto-optical disk was examined under the same conditions as those in Example 12. In this case, a bias magnetic field for reproduction was applied upward. With a reproducing power of 1.4 mW, no magneto-optical signal output for a previously recorded signal was obtained. This is considered to be due to the fact that an up spin mask was formed in the whole area of the reproducing layer 18' in the beam spot. With a reproducing power of 1.5 mW, the magnetization of the recording layer 22 was transferred through the control layer 20' to the reproducing layer 18' to obtain a magneto-optical signal output. This is considered to be due to the fact that an area having temperatures higher than the temperature at which the magnetization of the recording layer 22 is transferred through the control layer 20' to the reproducing layer 18' was formed in the beam spot to form an up spin mask and an opening. A signal-to-noise ratio (C/N) at this time was 42 dB.

With a reproducing power of 1.6 mW, the direction of magnetization of the reproducing layer 18' was made identical with the direction of the bias magnetic field, i.e., the upward direction, and the diameter of an area (opening) where the control layer 20' is exchange-bonded to the recording layer 22 became about 0.4 μm to obtain a C/N value of 46 dB. This C/N value is the same as that in Example 12. This is considered to be due to the fact that the addition of Tb to the reproducing layer 18' causes an increase in magnetic anisotropy to reduce the noise and simultaneously causes a decrease in magneto-optical effect to the contrary. Thus, these contrary effects were considered to counterbalance each other and obtain the same result as that in Example 12. However, the composition margin of the reproducing layer 18' can be widened by adding Tb to the layer 18'.

EXAMPLE 14

The composition of the control layer 20' was examined by preparing plural magneto-optical recording media each having three magnetic layers with the composition of the control layer 20' changed to TbFeCo, DyFeCo, and GdFeCo each showing in-plane magnetization. The recording and reproducing characteristics of these magneto-optical recording media were examined under the same conditions as those in Example 12. The results are shown in Table 10.

TABLE 10

| Composition | TbFeCo | DyFeCo | GdFeCo |
|---|---|---|---|
| C/N | 36 | 38 | 46 |

As apparent from Table 10, when TbFeCo or DyFeCo is used as the composition of the control layer 20', the recording and reproducing characteristics are poor. To the contrary, GdFeCo is suitable for the composition of the control layer 20'.

Further, the ratio of Gd, Fe, and Co suitable for the composition of the control layer 20' was examined. That is, the reproducing characteristic was measured by the same method as that in Example 12 when changing the content of Co in the composition of GdFeCo for the control layer 20'. The results are shown in Table 11.

TABLE 11

| Co content (at %) | 21 | 15 | 10 | 5 | 3 | 2 | 0 |
|---|---|---|---|---|---|---|---|
| C/N | 44 | 45 | 45 | 46 | 49 | 49 | 49 |

As apparent from Table 11, when the content of Co is in the range of 0 at % to 5 at %, C/N is improved. This is considered to be due to the fact that the Curie temperature of the control layer 20' was decreased to cause the formation of a mask at the downstream portion of the beam spot in addition to a mark at the upstream portion, with the result that a double mask was formed to improve the resolution.

EXAMPLE 15

It was found from Example 14 that the decrease in the Curie temperature of the control layer 20' causes the formation of the double mask to improve C/N. In Example 15, a nonmagnetic metal was added to the control layer 20' in order to decrease the Curie temperature of the control layer 20'. Plural magneto-optical recording media were prepared by adding various nonmagnetic metals Ng to the control layer 20' having the composition of GdFeCo. The reproducing characteristics of these recording media were measured by the same method as that in Example 12. The results are shown in Table 12.

TABLE 12

| Ng  | Si | Ti | Al | Cu |
|-----|----|----|----|----|
| C/N | 49 | 48 | 49 | 48 |

As apparent from Table 12, it is effective to add the nonmagnetic material to the control layer 20'. Next, examination was made on a change in reproducing characteristic with a change in amount of Si to be added as an example of the nonmagnetic material to the control layer 20'. The compositions and thicknesses of the reproducing layer 18', the control layer 20', and the recording layer 22 were set to the same as those in Example 12. That is, the composition of the control layer 20' was set to $Gd_{39}Fe_{56}Co_5$. In this example, Si was added to this composition of the control layer 20'. The amount of Si to be added was changed by changing the number of Si chips to be placed on a GdFeCo target for the control layer 20'. The results are shown in Table 13.

TABLE 13

| Si (at %) | 0  | 5  | 10 | 20 | 30 | 40 | 50 | 60 | 70 |
|-----------|----|----|----|----|----|----|----|----|----|
| C/N       | 46 | 46 | 47 | 48 | 48 | 49 | 49 | 48 | 40 |

As apparent from Table 13, when the content of Si is in the range of 10 at % to 60 at %, high C/N values can be obtained. When the content of Si is 70 at % or higher, C/N is decreased because the exchange bonding force between the reproducing layer 18' and the recording layer 22 is small.

According to the present invention, a magneto-optical recording medium which can effect high-density recording can be provided. Further, the present invention has an effect that a mark adjacent to a mark to be reproduced can be perfectly masked to improve a reproduction output. In addition, the crosstalk can also be improved.

What is claimed is:

1. A magneto-optical recording medium composed of a plurality of magnetic layers including a rare earth metal and a transition metal as main components, said magneto-optical recording medium comprising:

a magnetic reproducing layer having an easy axis of magnetization perpendicular to a film plane;

a magnetic control layer formed over said magnetic reproducing layer and having an easy axis of magnetization in a plane at a room temperature, a magnetic moment of the rare earth metal of said magnetic control layer being predominant over a magnetic moment of the transition metal of said magnetic control layer, said magnetic control layer including at least Gd as the rare earth metal and Fe as the transition metal; and a magnetic recording layer formed over said magnetic control layer and having an easy axis of magnetization perpendicular to said film plane;

wherein a Curie temperature Tc1 of said magnetic reproducing layer, a Curie temperature Tc2 of said magnetic control layer, and a Curie temperature Tc3 of said magnetic recording layer are related to satisfy Tc1>Tc2 and Tc3>Tc2; and a coercive force Hc1 of said magnetic reproducing layer at said room temperature and a coercive force Hc3 of said magnetic recording layer at said room temperature are related to satisfy Hc3>Hc1.

2. A magneto-optical recording medium according to claim 1, wherein said magnetic reproducing layer has a composition including GdFeCo as a main component.

3. A magneto-optical recording medium according to claim 1, wherein said magnetic control layer has a composition including GdFe as a main component.

4. A magneto-optical recording medium according to claim 1, wherein said magnetic control layer contains a nonmagnetic material in an amount of 0–60 at % selected from the group consisting of Si, Al and Ti.

5. A method of reproducing information recorded on a magneto-optical recording medium comprising a magnetic reproducing layer having an easy axis of magnetization perpendicular to a film plane; a magnetic control layer formed over said magnetic reproducing layer and having an easy axis of magnetization in a plane at a room temperature, a magnetic moment of a rare earth metal of said magnetic control layer being predominant over a magnetic moment of a transition metal of said magnetic control layer, said magnetic control layer including at least Gd as the rare earth metal and Fe as the transition metal; and a magnetic recording layer formed over said magnetic control layer and having an easy axis of magnetization perpendicular to said film plane; wherein a Curie temperature Tc1 of said magnetic reproducing layer, a Curie temperature Tc2 of said magnetic control layer, and a Curie temperature Tc3 of said magnetic recording layer are related to satisfy Tc1>Tc2 and Tc3>Tc2; and a coercive force Hc1 of said magnetic reproducing layer at said room temperature and a coercive force Hc3 of said magnetic recording layer at said room temperature are related to satisfy Hc3>Hc1; said reproducing method comprising the steps of:

directing a laser beam onto said recording medium as applying a bias magnetic field to heat said recording medium to temperatures lower than the Curie temperature of said magnetic recording layer; and forming a temperature distribution in a beam spot, said temperature distribution comprising a first area where the direction of magnetization of said magnetic reproducing layer is identical with the direction of said bias magnetic field, a second area where magnetization of said magnetic recording layer is transferred to said magnetic control layer and said magnetic reproducing layer, and a third area where the temperature of said magnetic control layer becomes higher than its Curie temperature and the direction of magnetization of said magnetic reproducing layer is identical with the direction of said bias magnetic field.

6. A magneto-optical recording medium according to claim 1, wherein said magnetic control layer has no compensation temperature.

* * * * *